United States Patent
Kudo et al.

(10) Patent No.: US 7,860,376 B2
(45) Date of Patent: Dec. 28, 2010

(54) CONTENT DELIVERY APPARATUS AND CONTENT REPRODUCTION APPARATUS

(75) Inventors: Takahiro Kudo, Katano (JP); Jun Ozawa, Nara (JP)

(73) Assignee: Panasonic Corporation, Osaka (JP)

( * ) Notice: Subject to any disclaimer, the term of this patent is extended or adjusted under 35 U.S.C. 154(b) by 1387 days.

(21) Appl. No.: 11/330,246

(22) Filed: Jan. 12, 2006

(65) Prior Publication Data

US 2006/0116965 A1 Jun. 1, 2006

Related U.S. Application Data

(63) Continuation of application No. PCT/JP2004/009207, filed on Jun. 23, 2004.

(30) Foreign Application Priority Data

Jul. 14, 2003 (JP) .............................. 2003-273903

(51) Int. Cl.
- *H04N 9/80* (2006.01)
- *H04N 5/77* (2006.01)
- *H04N 7/16* (2006.01)
- *H04N 7/18* (2006.01)
- *G07B 15/00* (2006.01)
- *G07B 15/02* (2006.01)
- *G06F 17/00* (2006.01)
- *G06Q 90/00* (2006.01)

(52) U.S. Cl. .................. 386/262; 386/248; 386/353; 386/362; 705/13; 705/500; 725/62; 725/75

(58) Field of Classification Search .................. 705/13; 725/1
See application file for complete search history.

(56) References Cited

U.S. PATENT DOCUMENTS

| | | | |
|---|---|---|---|
| 6,738,698 B2 | 5/2004 | Ichihara et al. | |
| 6,801,852 B2 | 10/2004 | Takahashi et al. | |
| 2002/0065711 A1* | 5/2002 | Fujisawa et al. | 705/13 |
| 2002/0188390 A1 | 12/2002 | Ichihara et al. | |
| 2002/0188391 A1 | 12/2002 | Takahashi et al. | |

FOREIGN PATENT DOCUMENTS

| | | |
|---|---|---|
| JP | 11-101652 | 4/1999 |
| JP | 11-153446 | 6/1999 |
| JP | 2001-357225 | 12/2001 |

(Continued)

*Primary Examiner*—Peter-Anthony Pappas
*Assistant Examiner*—Marc Dazenski
(74) *Attorney, Agent, or Firm*—Wenderoth, Lind & Ponack, L.L.P.

(57) ABSTRACT

A server apparatus 20 that is connected, through a communication network 11, to a mobile terminal 40 for reproducing a content and to a ticket gate machine 30. The ticket gate machine 30 detects that a user's entrance into a station area or boarding onto a vehicle, identifies at least a boarding zone, and notifies the identified boarding zone to the server apparatus 20. The server apparatus 20 includes a required duration calculating unit 22 which calculates, based on the boarding zone notified by the ticket gate machine 30, a duration for a user traveling by the vehicle, a content selecting unit 23 which determines a content whose reproduction is completed within the calculated duration, and a data transmitting/receiving unit 21 which delivers the determined content to the mobile terminal 40.

18 Claims, 28 Drawing Sheets

FOREIGN PATENT DOCUMENTS

| | | |
|---|---|---|
| JP | 2002-108351 | 4/2002 |
| JP | 2002-114149 | 4/2002 |
| JP | 2002-123689 | 4/2002 |
| JP | 2002-175355 | 6/2002 |
| JP | 2002-293240 | 10/2002 |
| JP | 2002-298169 | 10/2002 |
| JP | 2002-303524 | 10/2002 |
| JP | 2002-350148 | 12/2002 |
| JP | 2002-365061 | 12/2002 |
| JP | 2002-365062 | 12/2002 |
| JP | 2003-143190 | 5/2003 |
| JP | 2003-179542 | 6/2003 |

* cited by examiner

FIG. 3

| Zone | Required duration |
|---|---|
| Kitaumeda~Nishimorimachi | 4 mins 30 seconds |
| Nishimorimachi~Higashihama | 3 mins 20 seconds |
| Higashihama~Sakaisujikitamachi | 5 mins 05 seconds |
| Sakaisujikitamachi~Nagahorimachi | 4 mins 15 seconds |
| Nagahorimachi~Nihongawa | 5 mins 11 seconds |
| ⋮ | ⋮ |

| User ID | Distribution destination | Preference information |
|---|---|---|
| 678901 | 06-1234-5678 | J-POP |
| | | Artist A |
| | | Heavy |
| | | Driving |
| 234567 | abc@def.com | Professional Baseball |
| | | Hanshin Taiders |
| ⋮ | ⋮ | ⋮ |

| Content ID | Category | Attribute | Reproduction duration |
|---|---|---|---|
| M234 | Foreign music (music) | Soft | 15 mins |
| M345 | J-POP(music) | Artist B | 27 mins |
| M456 | J-POP(music) | Heavy | 8 mins |
| M567 | News | English daily | 10 mins |
| M678 | Baseball digest | Hanshin Taiders | 7 mins |
| ... | ... | ... | ... |

26b

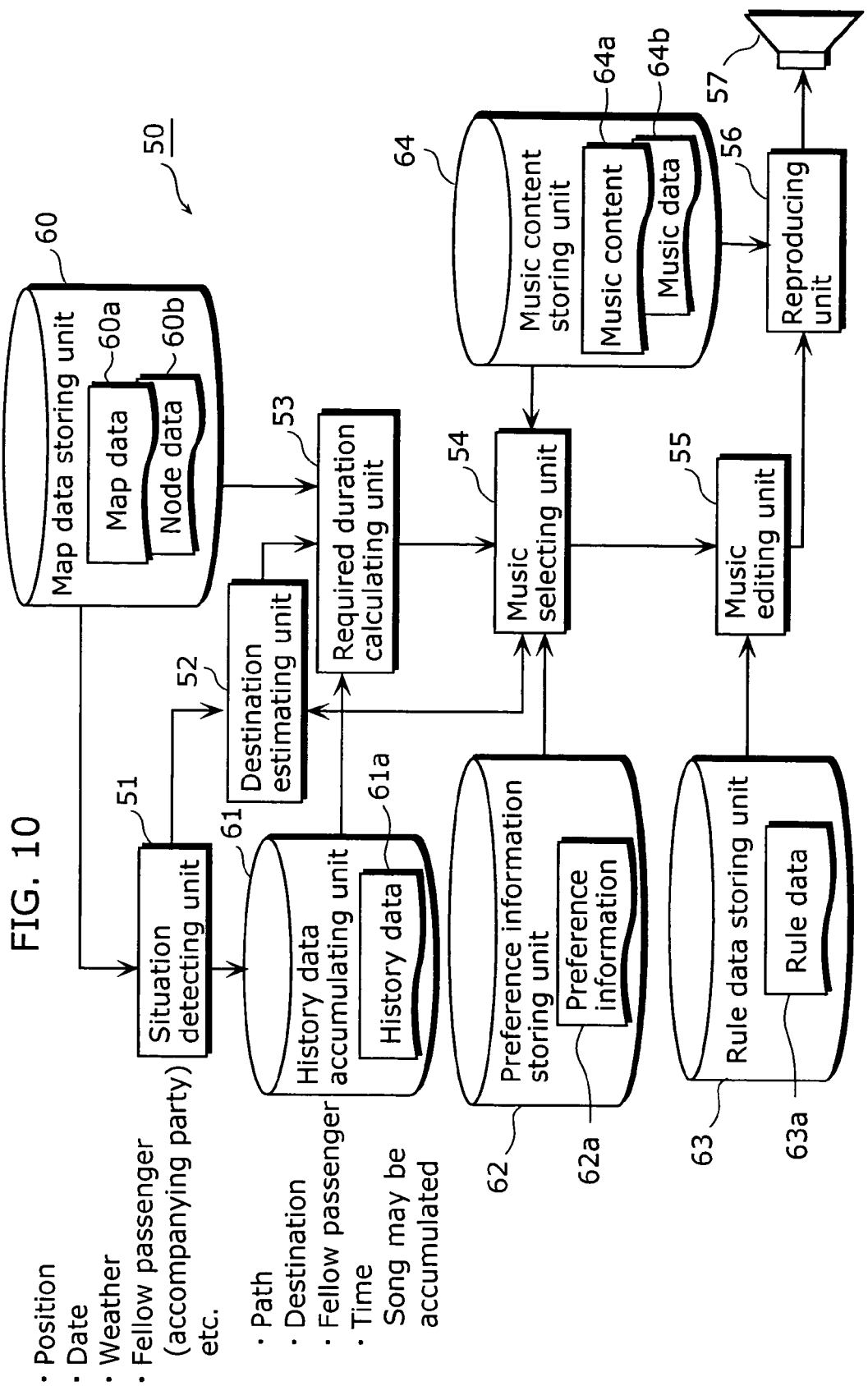

FIG. 11

| Node number | Type, Title | East longitude | North latitude |
|---|---|---|---|
| C1 | Crossing point | 135 degrees 20 mins 35.45 seconds | 34 degrees 44 mins 35.22 seconds |
| C2 | Crossing point | 135 degrees 24 mins 35.74 seconds | 34 degrees 44 mins 86.5 seconds |
| C3 | Crossing point | 135 degrees 22 mins 6.22 seconds | 34 degrees 44 mins 78.18 seconds |
| C4 | Crossing point | 135 degrees 22 mins 10.4 seconds | 34 degrees 45 mins 60.75 seconds |
| C5 | Crossing point | 135 degrees 22 mins 20.0 seconds | 34 degrees 46 mins 79.37 seconds |
| C6 | Crossing point | 135 degrees 20 mins 42.76 seconds | 34 degrees 46 mins 70.48 seconds |
| C7 | Crossing point | 135 degrees 22 mins 35.39 seconds | 34 degrees 47 mins 35.82 seconds |
| . | . | . | . |
| L123 | Landmark (home) | 135 degrees 19 mins 48.42 seconds | 34 degrees 42 mins 38.29 seconds |
| L124 | Landmark (work) | 135 degrees 30 mins 22.33 seconds | 35 degrees 12 mins 23.6 seconds |
| . | . | . | . |
| A427 | Area (Umeda North) | 135 degrees 29 mins 51.9 seconds | 34 degrees 41 mins 57.0 seconds |
| A428 | Area (Keihanna Gakkentoshi) | 135 degrees 46 mins 18.80 seconds | 34 degrees 44 mins 30.65 seconds |

| Date | Required duration | Departure location | Destination | Path | Weather | Driver | Fellow passenger |
|---|---|---|---|---|---|---|---|
| May 16, 2003 (Friday) | 45 mins | Home L123 | Work L124 | C2→C8→ C5→C6→ C17→C27 | Cloudy | Father | None |
| May 17, 2003 (Saturday) | 1 hrs 40 mins | Home L123 | Aobagahara L381 | C2→C8→ C23→C24→ C51→C63→ C55→C88→ C72→C101→ C98→C100 | Sunny | Father | Mother Eldest son Second son |
| May 17, 2003 (Sunday) | 12 mins | Home L123 | French restaurant Le Franc L130 | C2→C4→ C9→C12→ C19→C37 | Sunny | Eldest son | Girl friend |

| Music ID | Artist | Genre | Tune (tempo, rhythm, feeling) | Performance duration |
|---|---|---|---|---|
| ID001 | F | J-POP | Brisk | 34 mins |
| ID002 | G | Foreign music | Soft | 58 mins |
| ID003 | J | Jazz | Simple | 12 mins |
| .. | .. | .. | .. | .. |
| ID914 | G | Foreign music | Heavy | 38 mins |
| ID915 | XX | J-POP | Driving | 22 mins |

| Rule No. | Details |
|---|---|
| 1 | Select music pieces so that the music is gradually crescendo toward the middle of driving route and then diminuendo gradually approaching to arrival. |
| 2 | Reproduce driver's and fellow passenger's preferred music pieces one by one. |
| ... | ... |

63a

| Selected music pieces | |
|---|---|
| Music ID | Tune |
| 346 | Heavy |
| 390 | Simple |
| 609 | Soft |
| 34 | Rhythmic |
| 103 | Driving |
| ⋮ | ⋮ |

FIG. 22

| Date | Time | Radio | Television |
|---|---|---|---|
| 2003/2/3 | 7:55 | | 6 Channel |
| 2003/2/3 | 18:55 | 802MHz | |
| 2003/2/4 | 8:01 | | 6 Channel |
| 2003/2/4 | 18:45 | 802MHz | |
| 2003/2/5 | 7:57 | | 6 Channel |
| 2003/2/5 | 18:50 | 802MHz | |
| ... | ... | ... | ... |

FIG. 23

| Road ID | Number of driving times |
|---|---|
| R0132 | 12 times |
| R0134 | 12 times |
| R0142 | 13 times |
| R0187 | Once |
| R0189 | None |
| R0190 | None |
| ... | ... |

FIG. 24
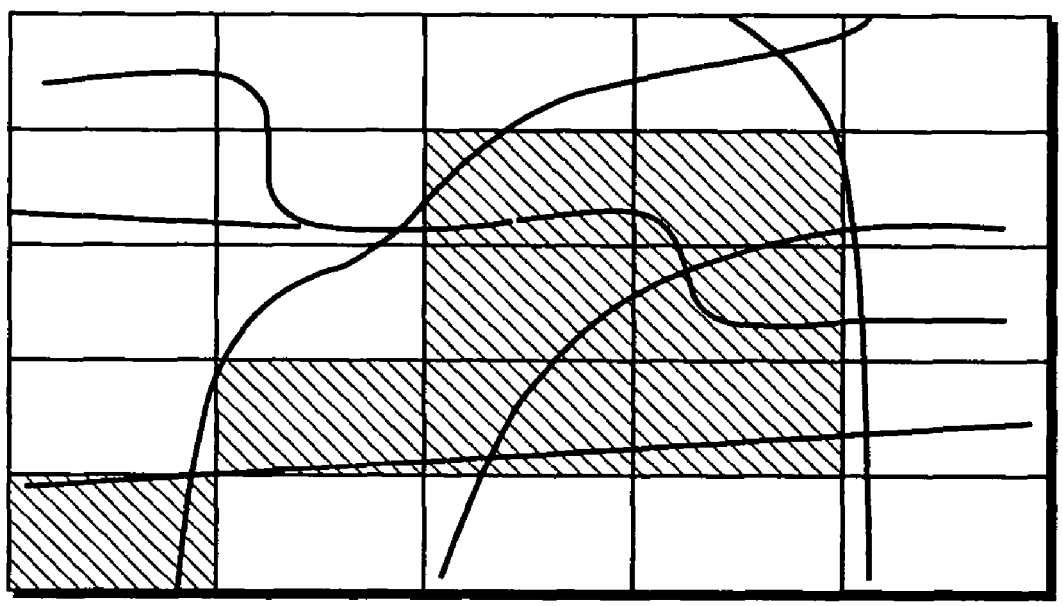
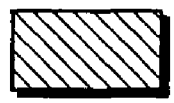 Area where usually used

FIG. 26

| Road ID | Number of music reproducing times | Number of driving times | Music reproduction rate |
|---|---|---|---|
| R0132 | 11 times | 12 times | 92% |
| R0134 | 10 times | 12 times | 83% |
| R0142 | 13 times | 13 times | 100% |
| R0187 | None | Once | 0% |
| R0189 | None | None | 0% |
| R0190 | None | None | 0% |
| ... | ... | ... | ... |

FIG. 29

| Content ID | Title | Content type | Content memory (MB) | Content reproduction duration | Time required for writing content (100KB/seconds) |
|---|---|---|---|---|---|
| 1 | Today's top news | News | 50M | 15 mins. | 500 seconds |
| 2 | Economy Flashback | News | 20M | 12 mins | 200 seconds |
| 3 | Ring road story preview | Film | 120M | 14 mins | 1200 seconds |
| 4 | Sports news | News | 80M | 10 mins | 800 seconds |
| ... | ... | ... | ... | ... | ... |

CONTENT DELIVERY APPARATUS AND CONTENT REPRODUCTION APPARATUS

CROSS REFERENCE TO RELATED APPLICATION

This is a continuation application of PCT Patent Application No. PCT/JP2004/009207 filed on Jun. 23, 2004, designating the United States of America.

BACKGROUND OF THE INVENTION (1.) Field of the Invention

The present invention relates to an apparatus which delivers a content such as music data and to an apparatus which reproduces the content, and in particular to an automatic delivery of the content to a mobile unit and to an automatic selection of the content in the mobile unit.

(2.) Description of the Related Art

A recent rapid development of network communication technology has allowed realizations of an HDD-installed on-vehicle device and a music distribution to a mobile terminal, so that various contents can now be enjoyed even during traveling time.

As a conventional technology relating to such music distribution to the mobile unit, for example, there is proposed a music data delivery apparatus and the like which automatically distributes music data matching user's behavior (see Japanese Laid-Open Patent Application No. 2002-108351). This music data delivery apparatus accumulates, as a delivery history, user's positional information and a music piece delivered at the position, and delivers a music piece corresponding to the positional information.

However, even at the same location, a time available for listening to music differs depending on the transportation to be used such as a car, a train and a bus. Therefore, the same music is not necessarily the best choice even at the same location as in the past. For example, in the case of commuting from home to work by train, an available content-viewing duration is a duration for which one is on a train. Accordingly, in the case where a content which lasts beyond the available viewing duration is delivered, the viewing has to be stopped before a reproduction of a music performance or a program is completely finished. In other words, the reproduction has to be discontinued in the middle of the reproduction of the music performance or the program.

Accordingly, a user's travel duration (available content-viewing duration) differs for each traveling, and a viewing of a content needs to be allowed in accordance with the duration. For example, it is necessary to meet demands such as "I want to listen to a 60-minute music album in 30 minutes", or "I want to watch a 3-hour live-baseball broadcast in 30 minutes digest."

Thus, the present invention allows meeting such demands, and an object of the present invention is to provide a content delivery apparatus, a content reproduction apparatus and the like, which respectively allow an automatic delivery and an automatic reproduction of a content such as music performance and a program that is completely reproduced within a user's travel duration.

SUMMARY OF THE INVENTION

In order to achieve such aforementioned object, a content delivery apparatus according to the present invention is a content delivery apparatus which is connected, through a communication network, to a mobile terminal for reproducing a content and to a ticket gate machine, the apparatus including: a travel duration calculating unit which calculates a travel duration for a user traveling by vehicle, based on a boarding zone notified from a ticket gate machine which identifies at least the boarding zone by detecting the user's entrance into a station area or boarding onto the vehicle; a content determining unit which determines a content to be reproduced whose reproduction completes within the calculated travel duration; and a delivery unit which delivers the determined content to the mobile terminal. Accordingly, the content whose reproduction is completed within the user's travel duration is delivered, so that inconveniences such that a viewing has to be discontinued in the middle of reproducing the content are avoided.

Here, the ticket gate machine identifies a user ID which identifies the user in addition to the boarding zone, notifies the content delivery apparatus of the identified user ID together with the boarding zone, and the delivery unit may deliver the content to a mobile terminal which corresponds to the user ID notified by the ticket gate machine. Accordingly, the user can receive an automatic delivery of the content to a mobile terminal owned by the user only by passing through the ticket gate machine.

Also, the ticket gate machine identifies the user ID for identifying the user in addition to the boarding zone, notifies the content delivery apparatus of the identified user ID together with the boarding zone, wherein the content delivery apparatus further includes a user information storing unit which holds user information in which preference information indicating a preference of a content is associated with each user ID. The content determining unit may specify the preference of the user indicated by the user ID notified by the ticket gate machine and determine a content matching the specified preference, with reference to the user information. Accordingly, the user can receive the delivery of a content which matches the user's preference and acquire sufficient satisfaction.

Also, the content delivery apparatus further obtain information from a content storing unit in which a plurality of contents are stored, and the content determining unit may determine, as the content to be reproduced, a content whose reproduction duration is within the travel duration, from among the plurality of contents stored in the content storing unit. Herein, the content determining unit may determine, as the content to be reproduced, a content whose reproduction duration is within the travel duration and is closest to the travel duration, from among the plurality of contents stored in the content storing unit. For example, the content determining unit obtains, in advance, a content designated by a user, and determines, as the content to be reproduced, the designated content in the case where a reproduction duration of the designated content is within the travel duration. Accordingly, the content that is previously selected by a user from the content storing unit included in the content delivery apparatus is delivered to the user.

Also, the content delivery apparatus, in the case where a reproduction duration of the designated content exceeds the travel duration, may edit the content stored in the content storing unit so that the reproduction duration falls within the travel duration, and determine the edited content as the content to be reproduced.

Similarly, the content determining unit, in the case where the reproduction of the content matching the preference, may edit the content so that the reproduction duration of the content falls within the travel duration, and determine the edited content as the content to be reproduced. Accordingly, even in the case where a content designated by the user or a content matched with the user's preference has a reproduction duration which exceeds a user's travel duration, the content is delivered after being edited so that the content has a reproduction duration which falls within the user's travel duration. Therefore, the user can reliably view the overall content within the travel duration without suspending the viewing of the desired content.

In addition, the content delivery apparatus further includes a station information storing unit which holds station information in which required durations for respective station zones are registered, wherein the travel duration calculating unit may calculate the travel duration with reference to the station information. Herein, the content delivery apparatus further includes a station information updating unit which updates the required durations of the station information stored in said station information storing unit, wherein the travel duration calculating unit may calculate the travel duration with reference to the station information updated by the station information updating unit. Accordingly, for example, when traveling by bus, even in the case where a road is crowded due to a traffic and the like because of a construction or an accident, an influence of a weather, or other factors, a duration in a station zone is updated in real time depending on a congestion situation by referring to road/traffic information or weather information; a content is determined in accordance with the updated travel duration; and the determined content is delivered to a user. Further, since a delay of a bus and the like are also caused by a congestion degree in the bus, the influence on the delay can be considered by detecting frequency of passengers' boarding and unloading using a ticket machine for numbered tickets, a device into which a bus card is inserted and the like.

Also, a boarding zone notified by the ticket gate machine only includes a boarding station, wherein the content delivery apparatus further includes a destination identifying unit which identifies a destination of the user, the travel duration calculating unit may identify a boarding zone from a boarding station included in the boarding zone and the destination identified by the destination identifying unit, and calculate the travel duration based on the identified boarding zone. Accordingly, even in the case where a destination cannot be identified from the boarding ticket, the travel duration is calculated so that a content delivery corresponding to the travel duration can be allowed.

Further, in order to achieve the aforementioned object, an on-vehicle content reproduction apparatus according to the present invention which reproduces a content, the apparatus including: a destination identifying unit which identifies a destination to which a vehicle is headed; a required duration calculating unit which calculates a duration required for getting to the identified destination; a content determining unit which determines a content whose reproduction is completed within calculated required duration; and a reproducing unit which reproduces the determined content. Accordingly, the content whose reproduction is completed within the duration of getting to the destination is automatically reproduced so that an inconvenience such that the viewing of the content has to be suspended is avoided.

Here, the content reproduction apparatus further includes: a driving history accumulating unit which accumulates a driving history in past; and a current situation detecting unit which detects a current situation including a current position of the vehicle, wherein the destination identifying unit may estimate a destination by matching the current situation detected by the current situation detecting unit with the driving history accumulated in the driving history accumulating unit, and identify the estimated destination as the destination to be headed. Accordingly, a content is selected based on the estimated destination, so that, even in the case where the user does not input the destination, an appropriate content whose reproduction is completed within the travel duration is selected and reproduced.

Further, the content reproduction apparatus further includes: a passenger detecting unit which detects a passenger on the vehicle including a driver; and a preference information storing unit which holds preference information indicating a content preference for each user, wherein content determining unit may identify a preference of the passenger detected by the passenger detecting unit by referring to the preference information, and determine a content matching the identified preference. Accordingly, the user can view the content matching the user's preference, and acquire sufficient satisfaction.

Also, the content reproduction apparatus further includes a content storing unit which holds a plurality of contents, wherein the content determining unit may select, from among the contents stored in the content storing unit, a plurality of contents so that a total of reproduction durations of the contents does not exceed the required duration, and determine the selected content as the content to be reproduced. Herein, the content reproduction apparatus further includes a rule data storing unit which holds rule data indicating a rule for sequentially reproducing the plurality of contents, wherein the content determining unit may determine, in accordance with the rule indicated by the rule data, a reproduction order of the selected contents, and the reproducing unit may reproduce the contents in accordance with the reproduction order determined by the content determining unit. Accordingly, for example, music pieces with tunes which gradually becomes crescendo toward a middle of the driving path are selected, and the music pieces with tunes which gradually becomes diminuendo approaching to the arrival are then selected. Therefore, the use can enjoy comfortable driving while listening to a produced content.

Note that, the present invention can be realized not only as the aforementioned content delivery apparatus and on-vehicle content reproduction apparatus, but also as a content delivery method, an on-vehicle content reproduction method, a content delivery system, a program thereof, and a computer readable recording medium on which the program is recorded.

As further information about technical background to this application, the disclosure of Japanese Patent Application No. 2003-273903 filed on Jul. 14, 2003 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 3 is a diagram showing an example of station information stored in a station information storing unit;

FIG. 4 is a diagram showing an example of user information stored in a user information storing unit;

FIG. 5 is a diagram showing an example of content information stored in a content storing unit;

FIG. 10 is a functional block diagram showing a structure of the on-vehicle content reproduction apparatus;

FIG. 11 is a diagram showing an example of a node database stored in a map data storing unit;

FIG. 12 is a diagram showing an example of history data accumulated in a history data accumulating unit;

FIG. 14 is a diagram showing an example of music data stored in a music content storing unit;

FIG. 15 is a diagram showing an example of rule data stored in a rule data storing unit;

FIG. 22 is a diagram showing an example of history data showing user's customary behavior;

FIG. 23 is a diagram showing a data example of a driving history showing a driving number of times on each road;

FIG. 24 is a diagram for a calculation example of a familiarity with a road;

FIG. 26 is a diagram showing an example of history data relating to a music piece that was being reproduced while driving on the road;

FIG. 28 is a communication sequence diagram showing a procedure of delivering the content in the content delivery system which is made up of the server apparatus shown in FIG. 27 and the like;

FIG. 29 is a diagram showing an example of data in which information relating to a content, a type of the content, and a memory of the content is registered in advance.

DESCRIPTION OF THE PREFERRED EMBODIMENT(S)

Hereafter, embodiments of the present invention are described in detail with reference to drawings.

First Embodiment

Figure 1:
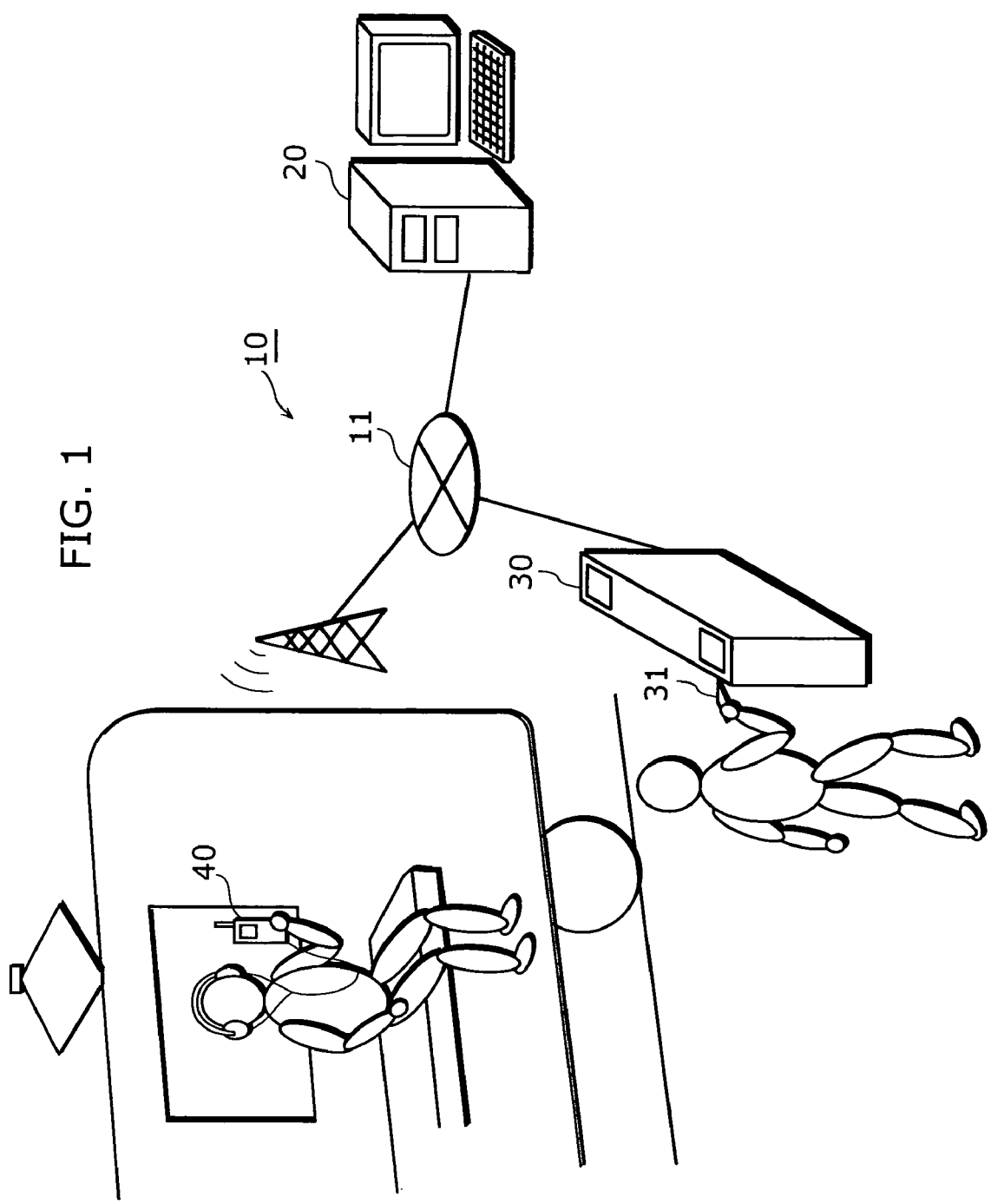
FIG. 1 is a diagram showing an overall structure of a content delivery system according to a first embodiment of the present invention.

FIG. 1 is a diagram showing an overall structure of a content delivery system 10 according to the first embodiment of the present invention. The content delivery system 10 is a system which automatically delivers contents such as music and video corresponding to a required duration necessary for traveling by train, or bus and the like. It includes a server apparatus 20, a ticket gate machine 30 and a mobile terminal 40.

The ticket gate machine 30 is a gate device placed at a station, in a bus and the like, and notifies the server apparatus 20 via a communication network 11 of information (here, the information is referred to as information including "a user ID" identifying a user and a boarding zone, and is hereafter referred to as "pass information") recorded in a pass 31 (or a computer readable boarding card and the like into which a zone is recorded), when detecting that the pass 31 is inserted. In other words, in the case of detecting the user's entrance into a station area or boarding onto a train, the ticket gate machine 30 reads out the "pass information" from a boarding ticket such as a pass, and notifies the server apparatus 20 of the "pass information"

The server apparatus 20 is a sever apparatus such as a computer which identifies a required duration necessary for a user traveling by train or bus, in accordance with the pass information sent from the ticket gate machine 30, and automatically delivers a content corresponding to the required duration, that is a content edited so that a reproduction of the content is completed within the travel duration, to the mobile terminal 40 owned by the user.

The mobile terminal 40 is a mobile-type terminal apparatus such as a cellular phone and a Personal Digital Assistant (PDA) owned by a user. It has a function of receiving and storing the music or the video content delivered from the server apparatus 20, and reproducing the content.

Figure 2:
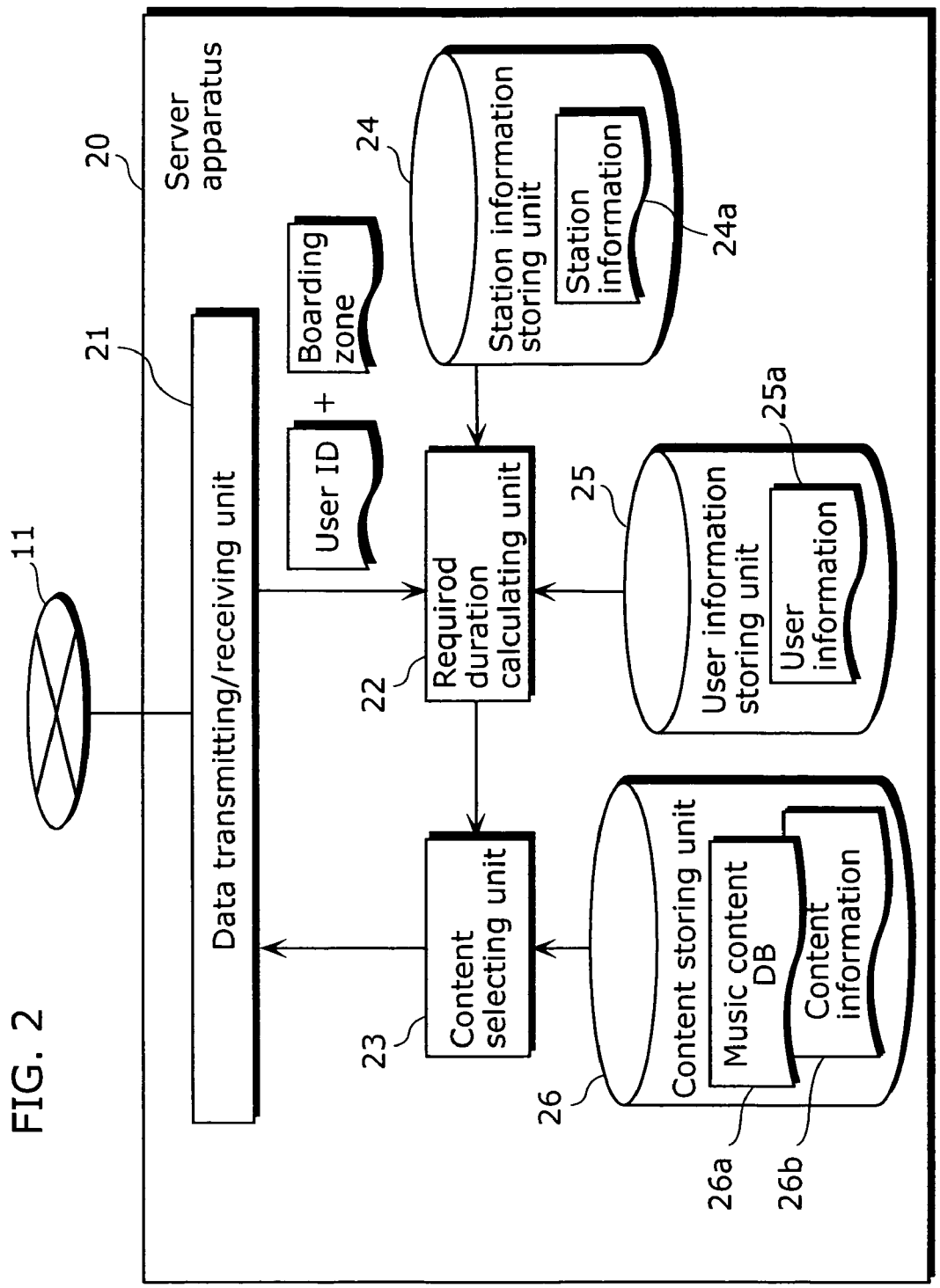
FIG. 2 is a block diagram showing a detailed structure of a server apparatus shown in FIG. 1.

FIG. 2 is a block diagram showing a detailed structure of the server apparatus 20 shown in FIG. 1. The server apparatus 20 includes a data transmitting/receiving unit 21, a required duration calculating unit 22, a content selecting unit 23, a station information storing unit 24, a user information storing unit 25 and a content storing unit 26.

The data transmitting/receiving unit 21 is a communication interface which connects the present server apparatus 20 to the communication network 11.

The required duration calculating unit 22 is a processing unit which calculates a required duration necessary for the user's traveling, in accordance with the pass information transmitted by the ticket gate machine 30.

The content selecting unit 23 is a processing unit which, based on the required duration calculated by the required duration calculating unit 22, generates a content whose reproduction is completed in a duration that is closer to and within the required duration by selecting or editing the content, and transmits the obtained content to the data transmitting/receiving unit 21. The transmitted content is delivered to a mobile terminal 40 carried by the user via the communication network 11 by the data transmitting/receiving unit 21.

The station information storing unit 24 is a hard disk and the like which holds required durations needed for a train and a bus to travel between every consecutive two stations on a nationwide scale. As shown in FIG. 3, the station information 24a is, for example, a database in which a "zone" identifying two stations and a "required duration" for the zone are associated with each other.

The user information storing unit 25 is a hard disk and the like which holds, for every targeted user, user information 25a which collects information relating to a content delivery destination and preferences. As shown in FIG. 4, the user information 25a is, for example, a database in which a "user ID" identifying a user to which the content is delivered, a "delivery destination" of the content, "preference information" (a category of the content), and the like are associated with each other.

The content storing unit 26 is a hard disk and the like in which a content database 26a such as music and video, and content information 26b including attribute information and the like about all contents included in the content database 26a are stored. As shown in FIG. 5, the content information 26b is, for example, a database in which a "content ID" identifying each content, a "category" to which the content belongs, a "reproduction duration" of the content and the like are associated with each other.

Next, the operation of the content delivery system 10 that is configured as described above is described.

Figure 6:
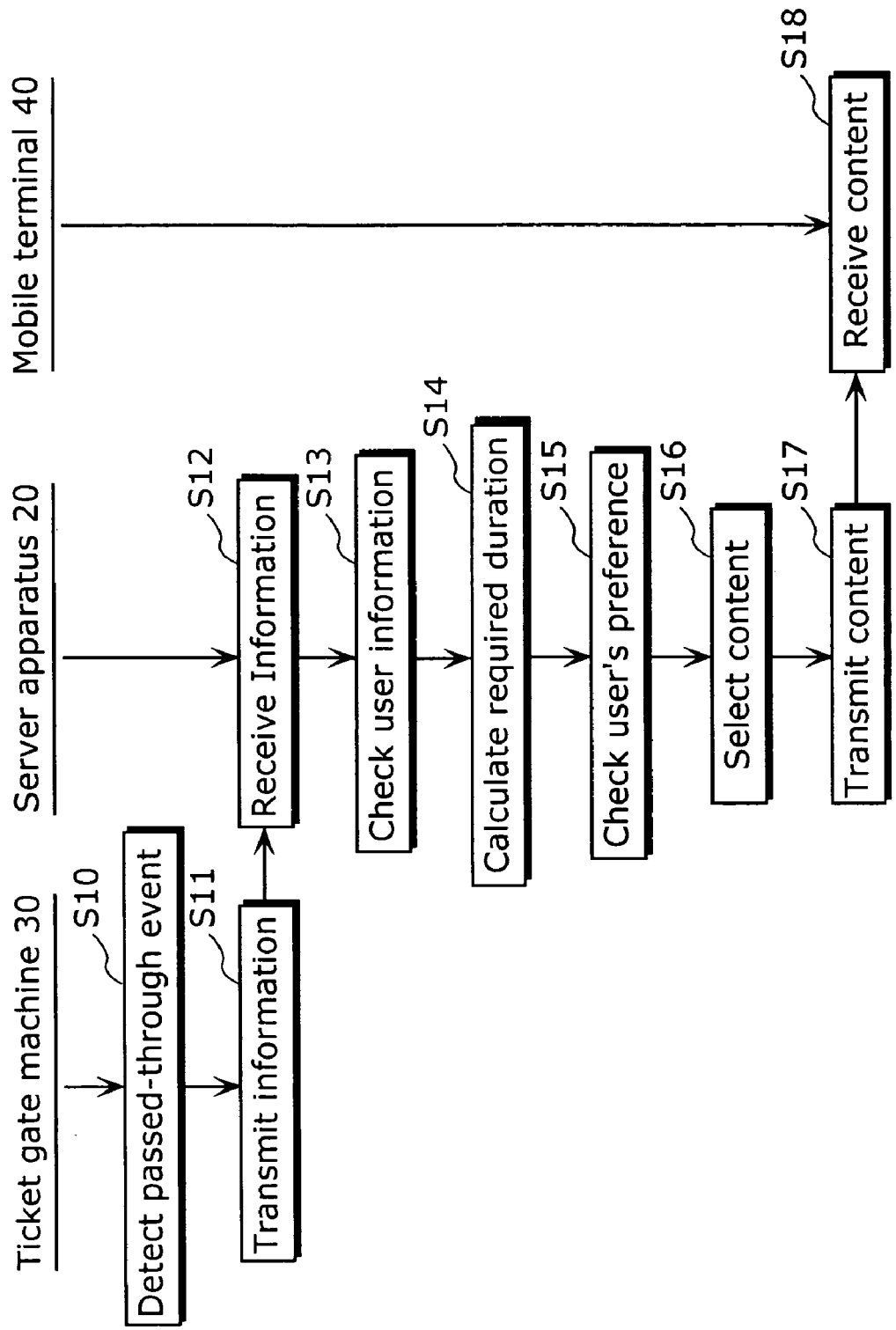
FIG. 6 is a communication sequence diagram showing a procedure of an automatic delivery of a content by a content delivery system.

FIG. 6 is a communication sequence showing a procedure of content automatic delivery performed by the content delivery system 10. When detecting the pass 31 inserted by a user who is going to get on a train or a bus (S10), the ticket gate machine 30 first reads out, as pass information, the "user ID" and "boarding zone" that are recorded on the pass 31, and transmits the pass information to the server apparatus 20 via the communication network 11 (S11).

The data transmitting/receiving unit 21 of the server apparatus 20 receives the pass information transmitted from the ticket gate machine 30, and transmits it to the required duration calculating unit 22 (S12). The required duration calculating unit 22 checks whether or not the user is a target to which the content is delivered (S13) by verifying whether or not the "user ID" included in the pass information matches the one registered as the user information 25a. In the case where the user is the targeted user for the content delivery, a required duration corresponding to a boarding zone is calculated (S14) by referring to the station information 24a from the "boarding zone" included in the pass information. In other words, the required duration calculating unit 22 calculates a required duration for the "boarding zone" by reading, from the station information 24a, and summing the required durations for all adjacent zones included in the "boarding zone".

After that, the required duration calculating unit 22 reads out, from the user information 25a, a "delivery destination" and "preference information" corresponding to the "user ID" (S15), and notifies the content selecting unit 23 of the read "delivery destination" and "preference information" together with the "user ID" and the calculated "required duration".

The content selecting unit 23, by referring to the content information 26b, identifies, from among the contents belonged to the "preference information" notified from the required duration calculating unit 22, a "content ID" of a content whose reproduction is completed in a duration that is within the "required duration" notified from the required duration calculating unit 22 and is the closest reproduction duration to the required duration, reads out the content corresponding to the "content ID" from the content database 26a, and transmits the content together with the "delivery destination" notified from the required duration calculating unit 22 to the data transmitting/receiving unit 21 (S16). The data transmitting/receiving unit 21 which received the content and an instruction from the delivery destination delivers the content to the delivery destination (S17).

The mobile terminal 40 carried by a user receives the content delivered from the server apparatus 20 (S18), and notifies the reception to the user. The user who received the notification reproduces the content that is automatically delivered. Note that, in the case where a linking operation that the content is reproduced soon after the content is delivered is previously set, or in the case of a streaming delivery such as video that the delivery and the reproduction are performed at the same time, the mobile terminal 40 automatically reproduces the content along with the delivery or after the delivery is completed, without receiving an implied instruction from the user.

The content which is reproduced as described above is a content matching the user's preference and whose reproduction is completed within the user's boarding duration. Accordingly, the user can reliably listen to a preferred content from the beginning to the end while boarding on the train and the like.

Note that, while, in the present embodiment, the content selected by the server apparatus 20 reflects the user's preference, it is not necessary to reflect the user's preference. For example, a previously designated content may be delivered by identifying a content with a mobile terminal after the user passes through a gate and the like, or by which the user accesses to the server apparatus 20. Also, the preference information is not only limited to the category of the content. In the case of music, the preference information may be an artist, a genre, a tune, and the like. In the case of video, it may be a channel, a program title, a cast and the like. Also, regarding a registration of the preference information, the user may previously access to the server apparatus 20 and register the preference information; or the server apparatus 20 may automatically extract and register the preference information from the history of the content selected by the user.

In addition, according to the present embodiment, the server apparatus 20 selects a content whose reproduction is completed in duration within the calculated required duration and the duration is closest to the required duration. However, the content to be delivered is not only limited to the selected content, but it may be also a content (content group) after its reproduction duration is adjusted by editing the reproduction duration or by combining multiple contents together. In such case, the decision on whether to deliver the content by simply selecting it or after editing the content may be determined depending on various situations.

Figure 7A:
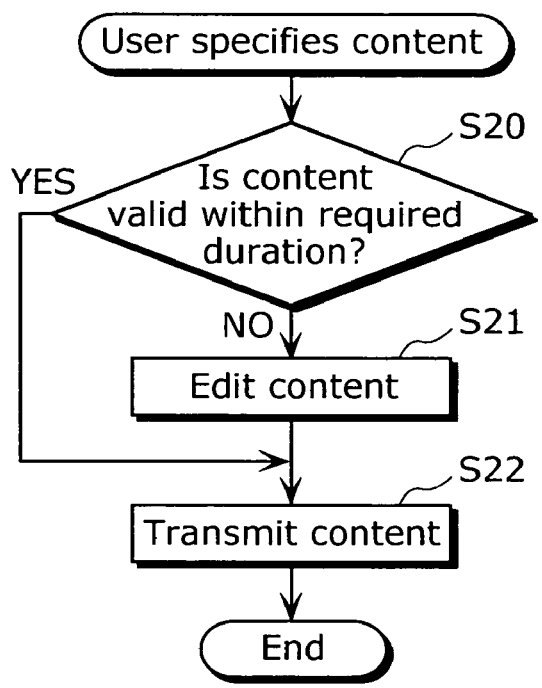
FIG. 7 is a flowchart showing a processing procedure in the case of editing the content and then delivering the edited content.
Figure 7B:
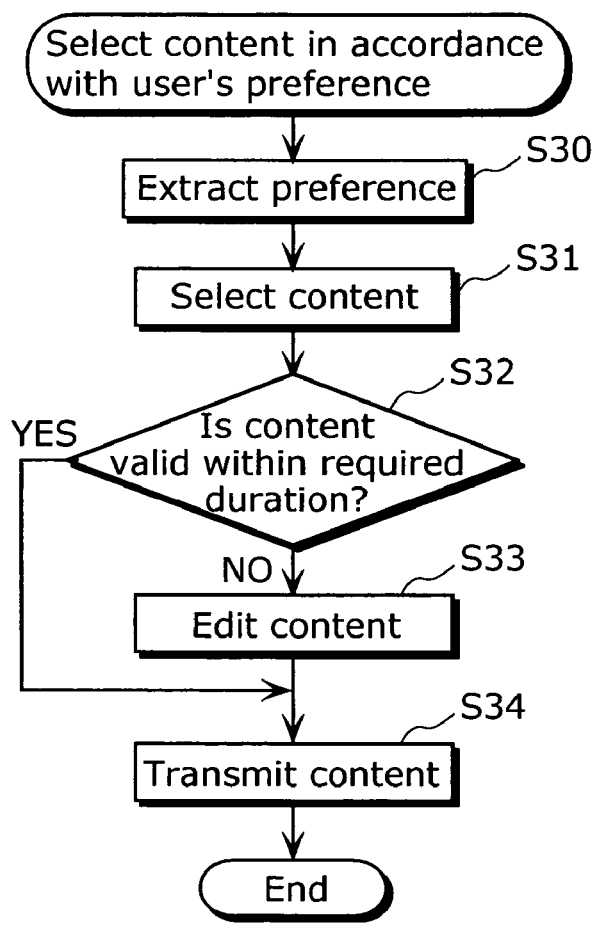

For example, as shown in FIG. 7A, in the case where the content that is previously designated by the user is delivered, whether or not the content is completely reproduced within the required duration is judged (S20), the content is simply delivered as it is (S22) in the case where the content is completely reproduced within the required duration (Yes in S20). On the other hand, in the case where the content is not completely reproduced within the required duration (No in S20), the content is edited so as to finish within the required duration (S21) and the content is delivered. Or, as shown in FIG. 7B, in the case of delivering the content corresponding to the user's preference, the user's preference is identified by referring to the user's information 25a and the like (S30), and the content matching the preference is selected (S31). After that, whether or not the content is completely reproduced within the required duration is judged (S32), in the case where the content is completely reproduced within the required duration (Yes in S32), the content is simply delivered as it is (S34). On the other hand, in the case where the content is not completely reproduced within the required duration (No in S32), the content is edited so as to finish within the required duration (S33) and delivered.

Figure 8A:
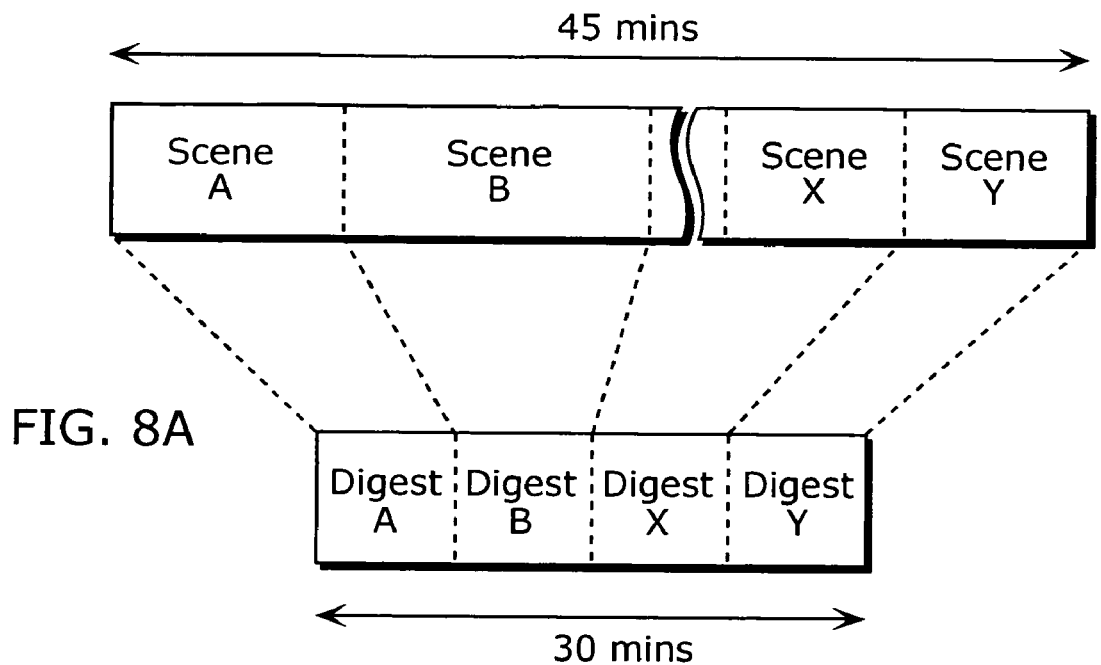
FIG. 8 is a diagram showing an example of content editing.
Figure 8B:
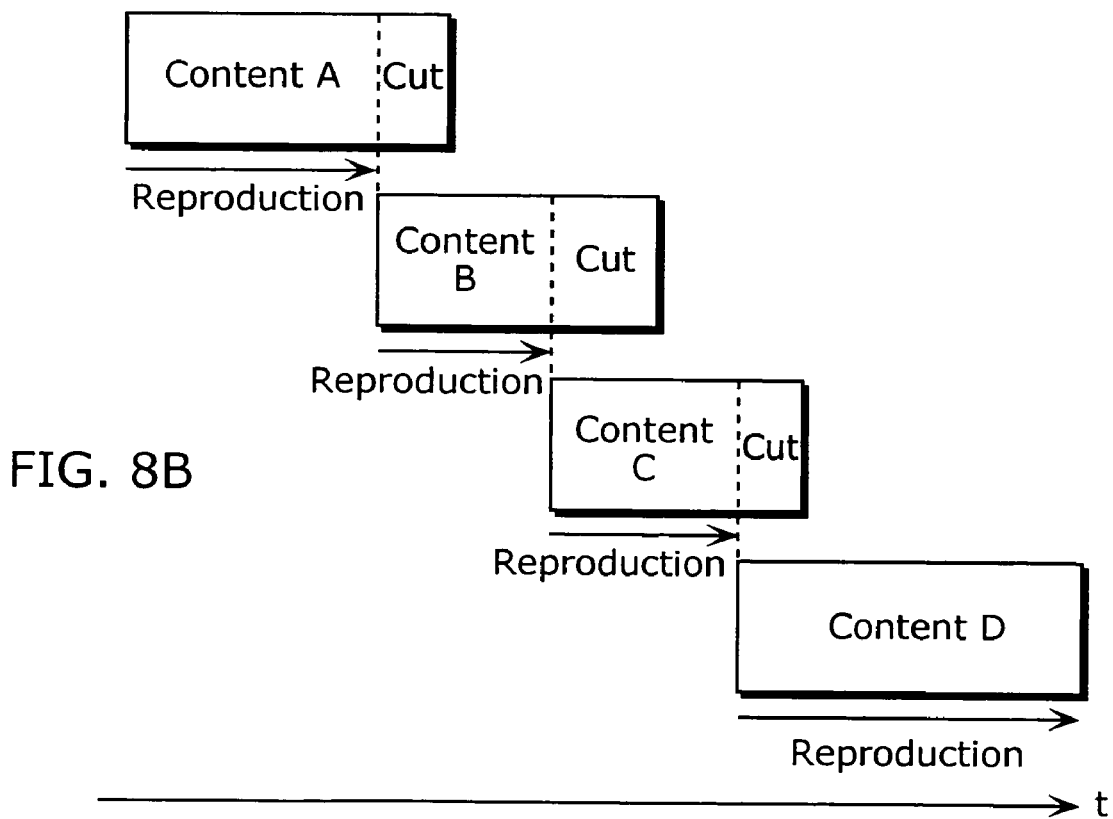

Note that, with respect to content editing, in the case where a single content is to be delivered, for example, as shown in FIG. 8A, a reproduction duration may be adjusted by storing digests (here referred to digests A, B, . . . , X, and Y) respectively corresponding to partial contents (here referred to uncut scenes A, B, . . . , X and Y) which make up of the single content, selecting either uncut version or digest version for each partial content, and combining the selected ones. Or, in the case where multiple contents are to be delivered such as a case of a music album composed of multiple music pieces, for example, as shown in FIG. 8B, the total reproduction duration may be adjusted by cutting a portion of each content (here referred to the ending portion).

Also, in the present embodiment, information relating to a user's boarding is notified to the server apparatus 20 by the ticket gate machine 30 which has read out the information recorded on the pass 31, it may be notified to the server apparatus 20 by the mobile terminal 40 carried by the user. For example, in the case where the information corresponding to the pass 31 is stored in the mobile terminal 40 and the mobile terminal 40 serves as a pass by which the ticket gate machine 30 communicates with the mobile terminal 40 using a Radio Frequency Identification (RFID) (wireless IC tag) and the like, the mobile terminal 40 may notify the server apparatus 20 of the "boarding zone" and the "user ID".

Also, the required duration for each station zone recorded in the station information 24a may be recorded, mainly in the case of a bus path, while with every passing hour updating the required duration calculated adaptively reflecting a degree of congestion of a current road by referring to road/traffic information, weather information, and boarding/unloading information of a passenger. For example, by detecting a required duration of an actual train and making the server apparatus 20 feed-back, the update of the required duration/content selection and distribution may be repeated so as to update the user's travel duration or the remaining travel duration to the real time, re-selecting and delivering the content based on the latest information (remaining travel duration).

Further, in the case where the user's destination can be known by referring to a schedule and the like stored in the mobile terminal 40 that is located on the Internet or in the mobile terminal 40 carried by the user, it is not necessary to notify the server apparatus 20 of a pair of the boarding station and unloading station. A required duration may be calculated using, as the boarding zone, the boarding station notified from the ticket gate machine 30 and a zone acquired from the schedule and the like or determined from the estimated destination.

Further, the content delivery in the present content delivery system may be a charged service. For example, when a boarding ticket such as a prepaid card is inserted to the ticket gate machine 30, the fee according to the delivery service of the content is deducted from the card in accordance with the boarding zone or the travel duration and the like determined from the boarding zone. Accordingly, the fare and the content delivery fee can be collected at the same time by the ticket gate machine 30 so that the charging processing is simplified.

Also, in the case where the content delivery history information for the user has been stored in the user information 25a and the content is a series (prequel and sequel, first volume to ninth volume, etc.), a sequel of the content which is delivered to the user immediately before may be preferentially transmitted.

Second Embodiment

Next, an on-vehicle content reproduction apparatus according to the second embodiment is described.

Figure 9:
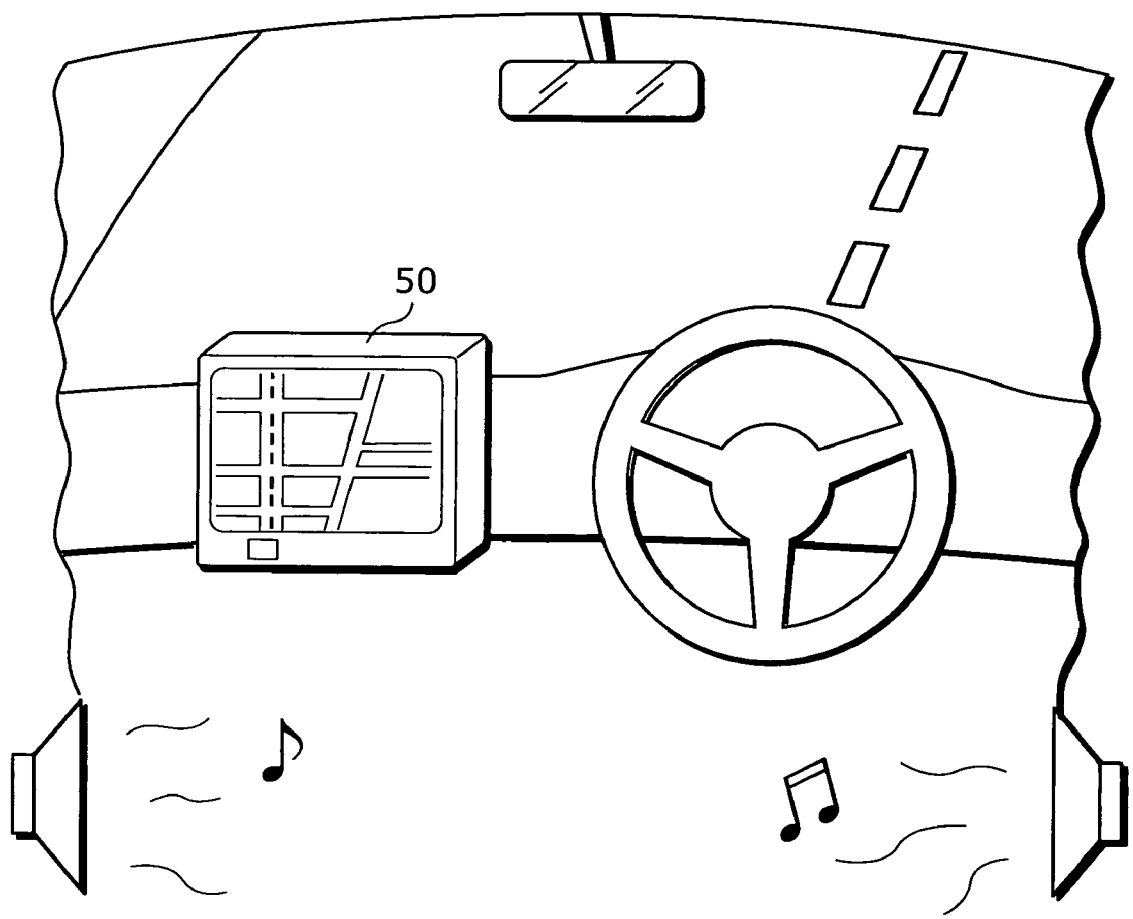
FIG. 9 is an external view of an on-vehicle content reproduction apparatus according to a second embodiment of the present invention.

FIG. 9 is an external view of an on-vehicle content reproduction apparatus 50 according to the present embodiment. This on-vehicle content reproduction apparatus 50 is an apparatus that is placed and used in the car, and has a function of reproducing music contents and a function of a car navigation.

FIG. 10 is a functional block diagram showing a structure of the on-vehicle content reproduction apparatus 50. The on-vehicle content reproduction apparatus 50 is an apparatus which automatically selects music pieces and plays them in compliance with a predetermined rule until the vehicle gets to the destination. It includes a situation detecting unit 51, a destination estimating unit 52, a required duration calculating unit 53, a music selecting unit 54, a music editing unit 55, a reproducing unit 56, a speaker 57, a map data storing unit 60, a history data accumulating unit 61, a preference information storing unit 62, a rule data storing unit 63 and a music content storing unit 64.

The map data storing unit 60 is a hard disk and the like in which map data 60a showing a national road map and a node database 60b for identifying a traveling path are stored. As shown in FIG. 11, in the case where main locations that are previously set on a national wide scale as nodes, the node database 60b is a database in which "a node number", "type", "title", "east longitude" and "north latitude" are recorded for each node.

The situation detecting unit 51 has a detector which detects various situations (a position of a vehicle, date, weather, a driver, a passenger, etc.), and is a processing unit of accumulating the various situation starting from which the engine is started until it is stopped, into the history data accumulating unit 61 as history data as shown in FIG. 12. Specifically, the situation detecting unit 51 detects: the condition of the engine from a position of an engine key and the like; a current position by a GPS installed in the car navigation device; date from a built-in calendar timer; the weather from an operation situation of a wiper, a rain drop sensor, temperature and humidity sensor and the like; and a driver and a passenger from a sitting sensor built in each seat, a position of a driver's seat, an adjusting position of a mirror, an ID signal from an infrared ray transmitter combined with the engine key, an ID by the wireless signal from the cell phone owned by a passenger or a telephone number and the like. The position of the vehicle is judged for each node by judging whether or not the position detected by GPS is located at which one of the nodes registered in the node database 60b, and a series of nodes where passed through is recorded as a traveling path. As shown in FIG. 12, the history data 61a is a database in which a collection of information relating to a traveling started from a start of the engine until the engine is stopped (or from the departing location to the arrival at the destination) is stored as an entry (unit). It is also information, for each entry, including items such as its "date", "required duration" starting from the start to the termination of the engine, "departing location", "path" composed of a series of nodes, "destination", "weather", "driver", and "passenger".

The history data accumulating unit 61 is a hard disk and the like for accumulating the history data 61a generated by the situation detecting unit 51.

The destination estimating unit 52 is a processing unit of estimating a destination of a current traveling by matching the situations (current location, date, weather, driver, passenger, etc.) detected by the situation detecting unit 51 to the history data 61a stored in the history data accumulating unit 61. For example, the destination estimating unit 52 extracts, from the history data 61a, all entries in which the "date (time range, day of week)", "departing location", "driver" and "passenger" respectively matching date (time range, day of week), current location, driver and passenger in the current situation, and estimates the most frequently appeared "destination" from among all "destinations" recorded in the extracted entry, as an estimated destination.

The required duration calculating unit 53 is a calculating unit which calculates a required duration necessary for the user traveling to the estimated destination notified from the destination estimating unit 52. For example, the distance between the current position and the estimated destination is calculated by referring to the map data 60a; an average velocity is calculated based on the traveled destination and the traveled duration by referring to the history data 61a for the current traveling; and a required duration necessary for traveling to the destination is calculated by dividing the distance to the destination by the average velocity. Or, a required duration necessary for traveling to the estimated destination is estimated by taking an average of "required durations" in all entries of the history data 61a in which the "destination" that is same as the estimated destination is recorded. Further, an average of only the "required durations" having the same situation as the situation where the estimation is performed from among the entries of the history data 61a (e.g. same time range, same day of the week) may be taken.

Figure 13:
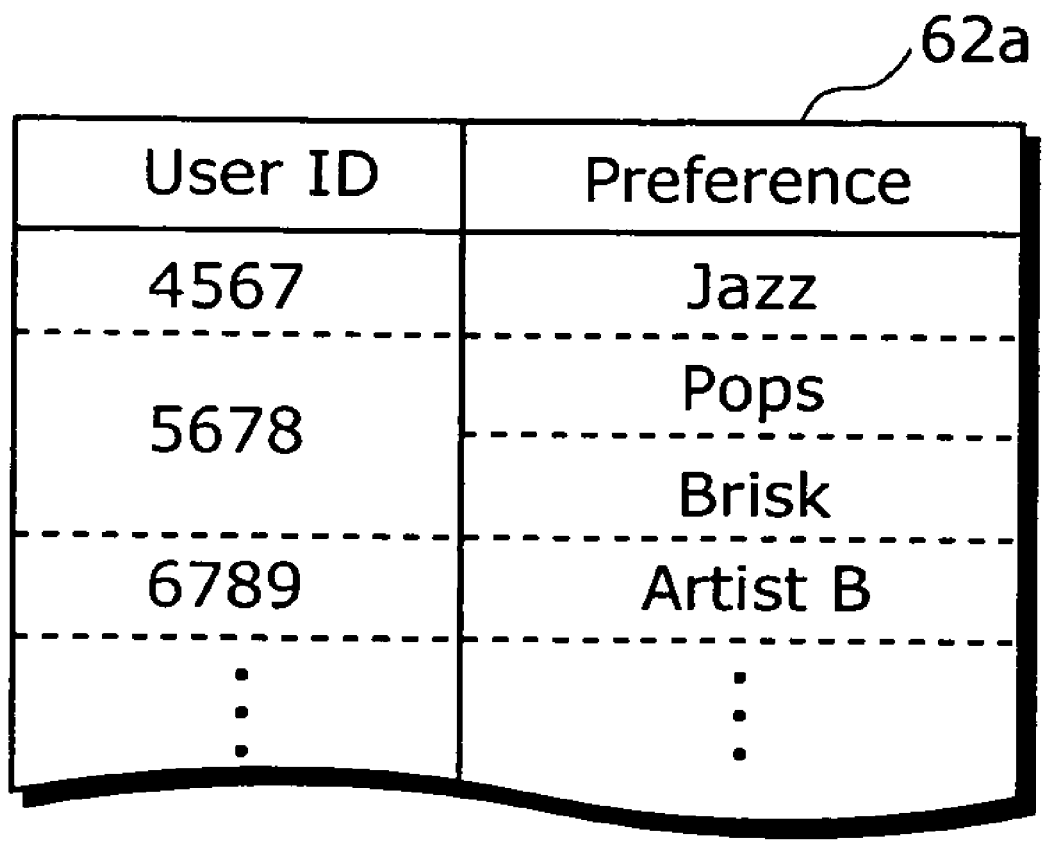
FIG. 13 is a diagram showing an example of preference information stored in a preference information storing unit.

The preference information storing unit 62 is a hard disk and the like in which the preference information 62a indicating, for each user, a preference about music is stored. As shown in FIG. 13, the preference information 62a is a data table in which the "user ID" for identifying a user and a "preference (here referred to as a preferred artist, genre, tune, etc.)" about a music piece are associated with each other, and is information registered previously by the user.

The music content storing unit 64 is a hard disk and the like in which a music content 64a about multiple music pieces and music data 64b indicating attributes of respective music pieces are recorded. As shown in FIG. 14, the music data 64b is a database in which a "music ID", "artist", "genre", "tune", "performance duration" for identifying a music piece are associated with each other.

The music selecting unit 54 is a processing unit which determines multiple music pieces which can be reproduced continuously until the user gets to the destination and are preferred by the driver and the passenger. In other words, "user IDs" of the driver and passenger in the current position are identified by referring to the "driver" and "passenger" of the history data 61a generated by the situation detecting unit 51; the "preference" is identified by referring to the preference information 62a; "music ID" and "performance duration" matching the "preference" are read out by referring to the music data 64b; and the selection of the "music ID" matching the "preference" is repeated until the total of the "performance durations" reaches the required duration notified from the required duration calculating unit 53.

The rule data storing unit 63 is a memory and the like in which rule data 63a showing a rule for continuously reproducing the multiple music pieces is stored. As shown in FIG. 15, the rule data 63a is a data table in which a "rule No." for identifying a rule and "details" of the rule are associated with each other. It is registered as a typical pattern at the time of reproduction, or registered by user's editing. The rule "details" include: for example, "selecting music pieces so as to be gradually crescendo toward the middle of the traveling path, and, after that, selecting music pieces which become gradually diminuendo toward the arrival"; "reproducing music pieces preferred by the driver and passenger one by one" and the like.

The music editing unit 55 reads out a rule corresponding to the previously set "rule No." by referring to the rule data 63a, determines a performance order of the multiple music pieces selected by the music selecting unit 54 in accordance with the rule, and notifies the reproducing unit 56 of the "music ID" in the determined order.

The reproducing unit 56 is a player which reads out, from the music content 64a, the content with the "music ID" notified from the music editing unit 55 and reproduces as a sound signal, and outputs the sound signal to the speaker 57. The speaker 57 is an on-vehicle speaker which outputs, as sound, the sound signal from the reproducing unit 56.

Next, the operation of the on-vehicle content reproduction apparatus 50 that is configured as described above is described.

Figure 16:
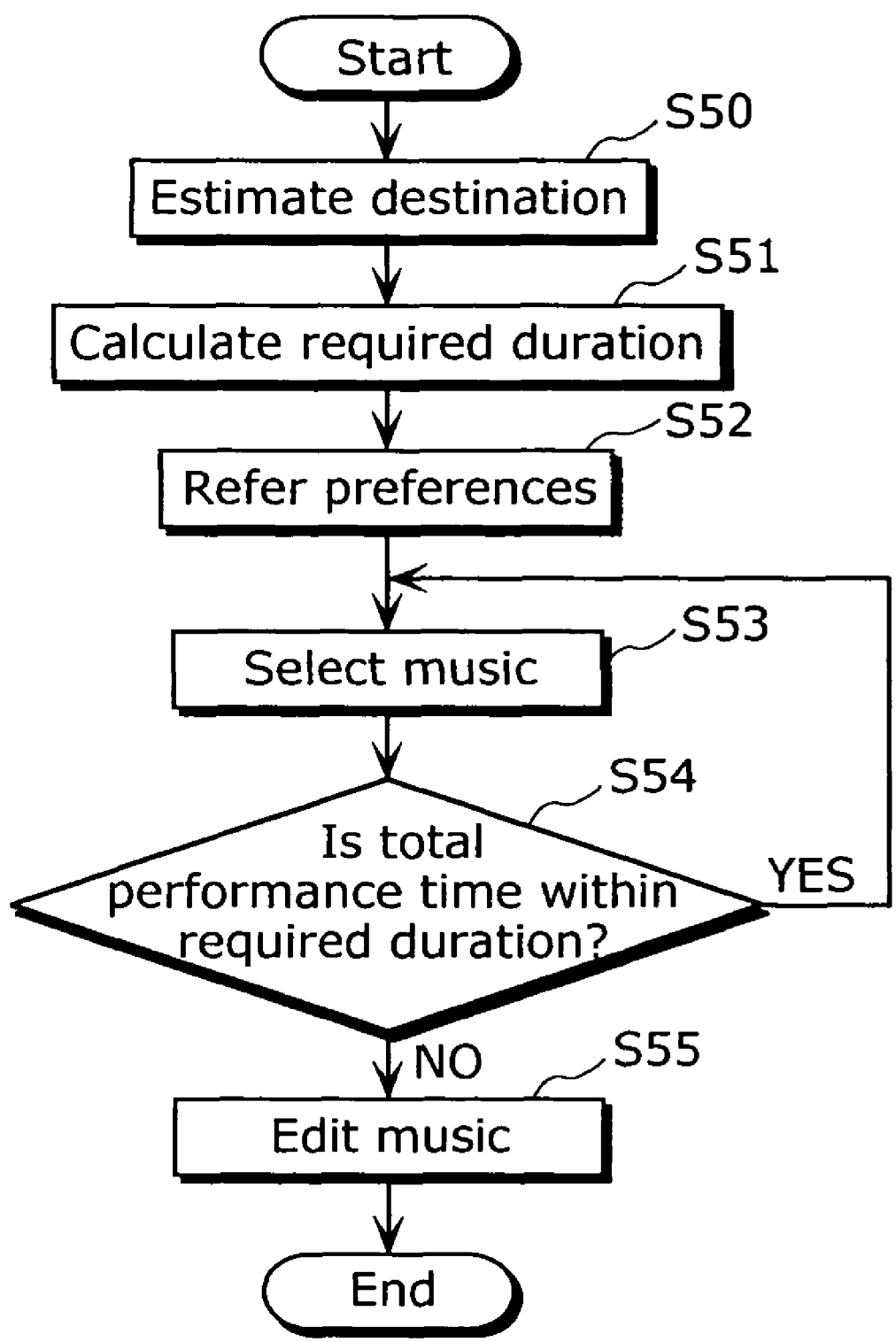
FIG. 16 is a flowchart showing a procedure of an automatic reproduction of a music content by an on-vehicle content reproduction apparatus.

FIG. 16 is a flowchart showing a procedure of an automatic reproduction of a music content by the on-vehicle content reproduction apparatus 50. When the engine is started, or when an automatic reproduction is designated by the user, the destination estimating unit 52 estimates a destination (S50). Specifically, by matching the situation (current position, date, weather, driver, passenger, etc.) detected by the situation detecting unit 51 to the history data 61a stored in the history data accumulating unit 61, the destination estimating unit 52 extracts, from the history data 61a, all entries in which the "date (time range, a day of week)", "departing location", "driver", and "passenger" respectively matching the data (time range, a day of week), departing location, driver and passenger in the current situation are recorded, and estimates, as an estimation destination, the most frequently appeared "destination" from among the all "destinations" recorded in the extracted entries.

After that, the required duration calculating unit 53 calculates a required duration necessary for getting to the estimated destination notified from the destination estimating unit 52 (S51). Specifically, the required duration calculating unit 53 calculates a distance between the current position and the estimated destination by referring to the map data 60a and dividing the distance by the average velocity; or calculates a required duration necessary for getting to the estimated destination from the past "required duration" recorded in the history data 61a.

Next, the music selecting unit 54 identifies a preference of a driver and a passenger by referring to the preference information 62a (S52), and then selects one music piece matching the preference by referring to music data 64b (S53). It then stores and integrates the "reproduction durations" registered in the music data 64b so as to judge whether or not the total duration of performance durations of the music pieces that have been selected has reached the required duration calculated by the required duration calculating unit 53 (S54). As the result, in the case where the total performance duration has not reached the required duration (Yes in S54), the music selecting unit 54 selects another music piece which matches the preference (S53); and in the case where the total performance duration has reached the required duration (No in S54), it notifies the music editing unit 55 of the "music IDs" of all music pieces that have been selected.

Lastly, the music editing unit 55 reads out a rule corresponding to a predetermined "rule No." from the rule data

Figures 17A, 17B:
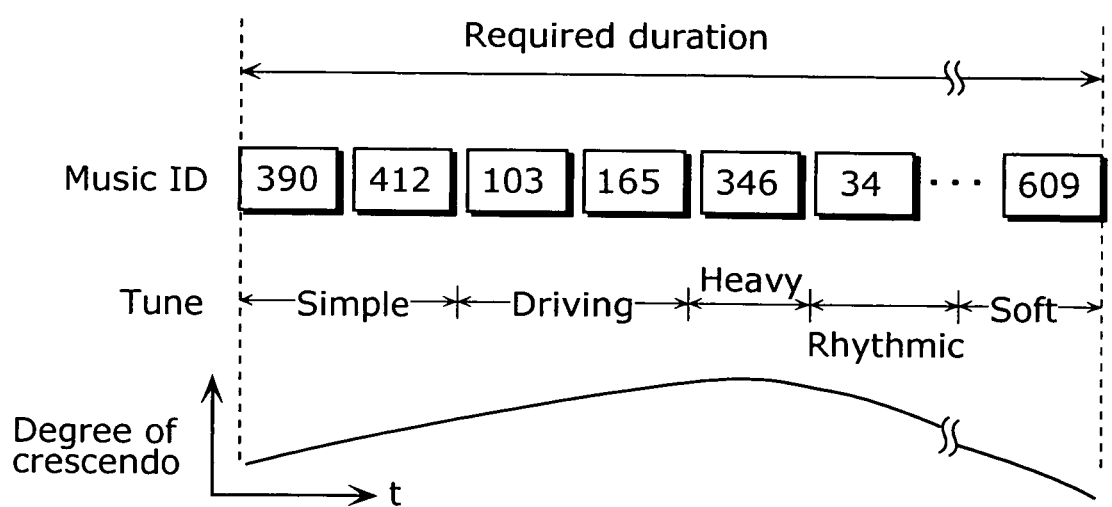
FIG. 17A is a diagram showing a list of music pieces selected by a music selecting unit.
FIG. 17B is a diagram showing an order of music pieces arranged by a music editing unit.

63a, determines a performance order of the all music pieces selected by the music selecting unit 54 in accordance with the rule, and notifies the reproducing unit 56 of the "music IDs" in said order (S55). For example, in the case where the music pieces notified from the music selecting unit 54 are as shown on a list of FIG. 17A and the predetermined rule "rule No." is "1", the music editing unit 55, as shown in FIG. 17B, arranges, from a primitive position toward the center position on the traveling path, the "music IDs" in order of a "simple" music, a "driving" music, and a "heavy" music, and arranges, from the center position toward the destination, "the music IDs" in order of the "heavy" music, a "rhythmic" music, and a "soft" music.

The "music IDs" arranged in such order are notified to the reproducing unit 56 from the music editing unit 55 and the music pieces are reproduced in that order. Therefore, the driver and the passenger can enjoy comfortable driving while their preferred music pieces are reproduced from the start of automatic reproduction until the arrival to the destination and the music pieces that are selected so as to be gradually crescendo toward the middle of their traveling path then becomes gradually diminuendo toward the end of the traveling.

Note that, while, in the present embodiment, an estimated destination is used for calculating a required duration, the destination set by the user may be used. By user's setting of the destination, an approximate required duration from the current location to the destination is automatically calculated so that music may be selected based on that information.

Also, the required duration may be, with each passing hour, updated by appropriately re-calculating it while reflecting dynamic changes of the following situation, in the case where the estimated destination is changed by repeating an estimation of the destination and the situation such as a degree of congestion on the road is changed. Based on the updated required duration, the music pieces then may be re-selected and re-arranged.

Also, while, in the present embodiment, the preference information 62a is information registered previously by the user, it may be automatically generated by extracting the preference from the selection history of the music pieces by the user.

Note that, using the music information about a music piece that was being heard immediately before the selection, a selection standard so that a music piece to be selected is smoothly connected to that music piece may be set. For example, supposing that the user first selects a music piece M by an artist A when the engine is started. It is assumed that the music editing unit 55 edits mainly the music pieces by the artist A using the information that is the artist A, or edits music pieces that have tunes similar to the tunes of the music piece M.

In the above, the content delivery system and the on-vehicle content reproduction apparatus according to the present invention are described based on the embodiments, the present invention is not restricted to these embodiments.

For example, in the first embodiment, the content is directly delivered from the server apparatus 20 to the mobile terminal 40 carried by the user, the content may be delivered to the user via a memory card such as a SD card.

Figure 18:
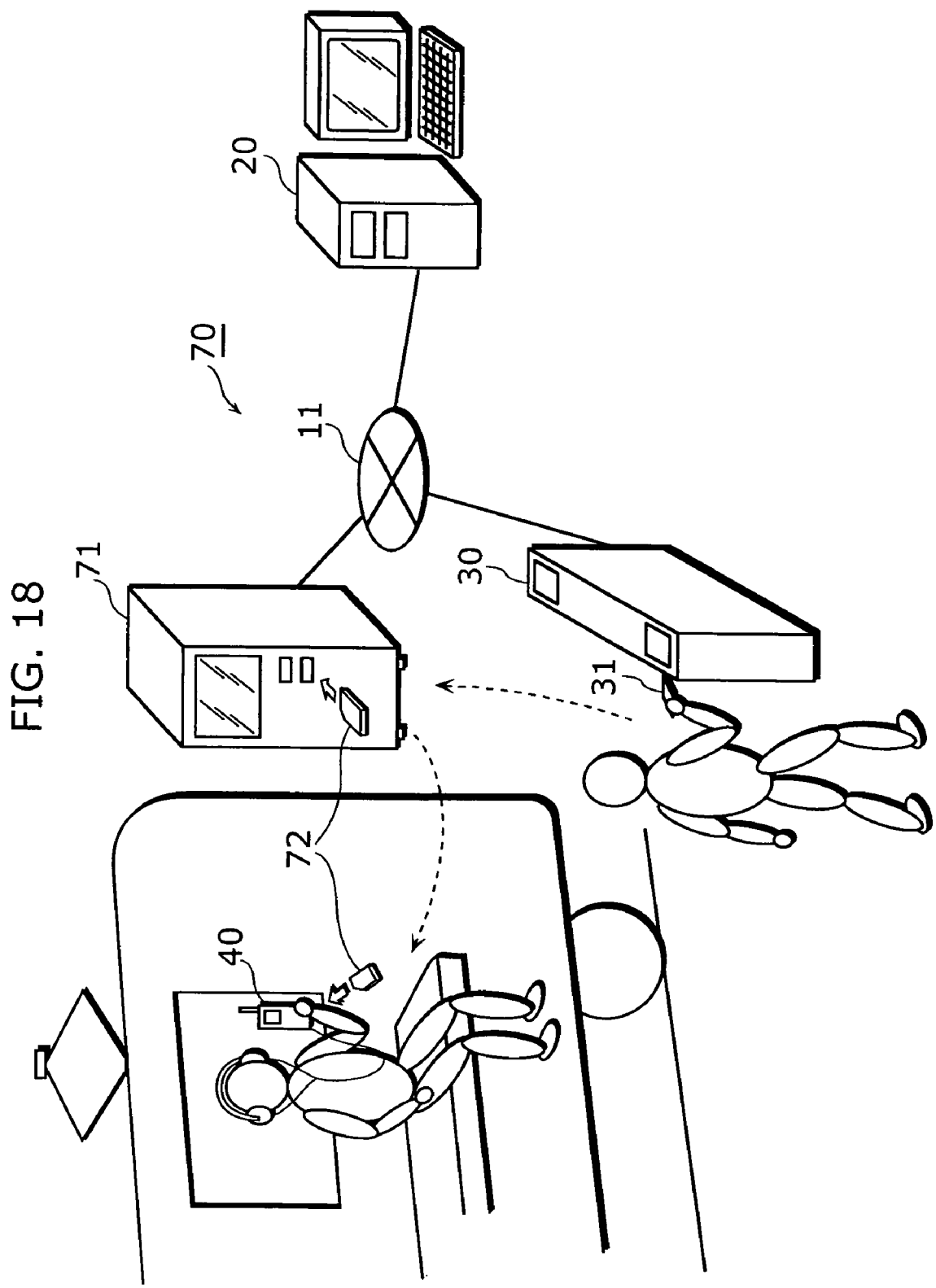
FIG. 18 is a diagram showing an overall structure of a content delivery system for delivering a content to a user via a memory card.
Figure 19:
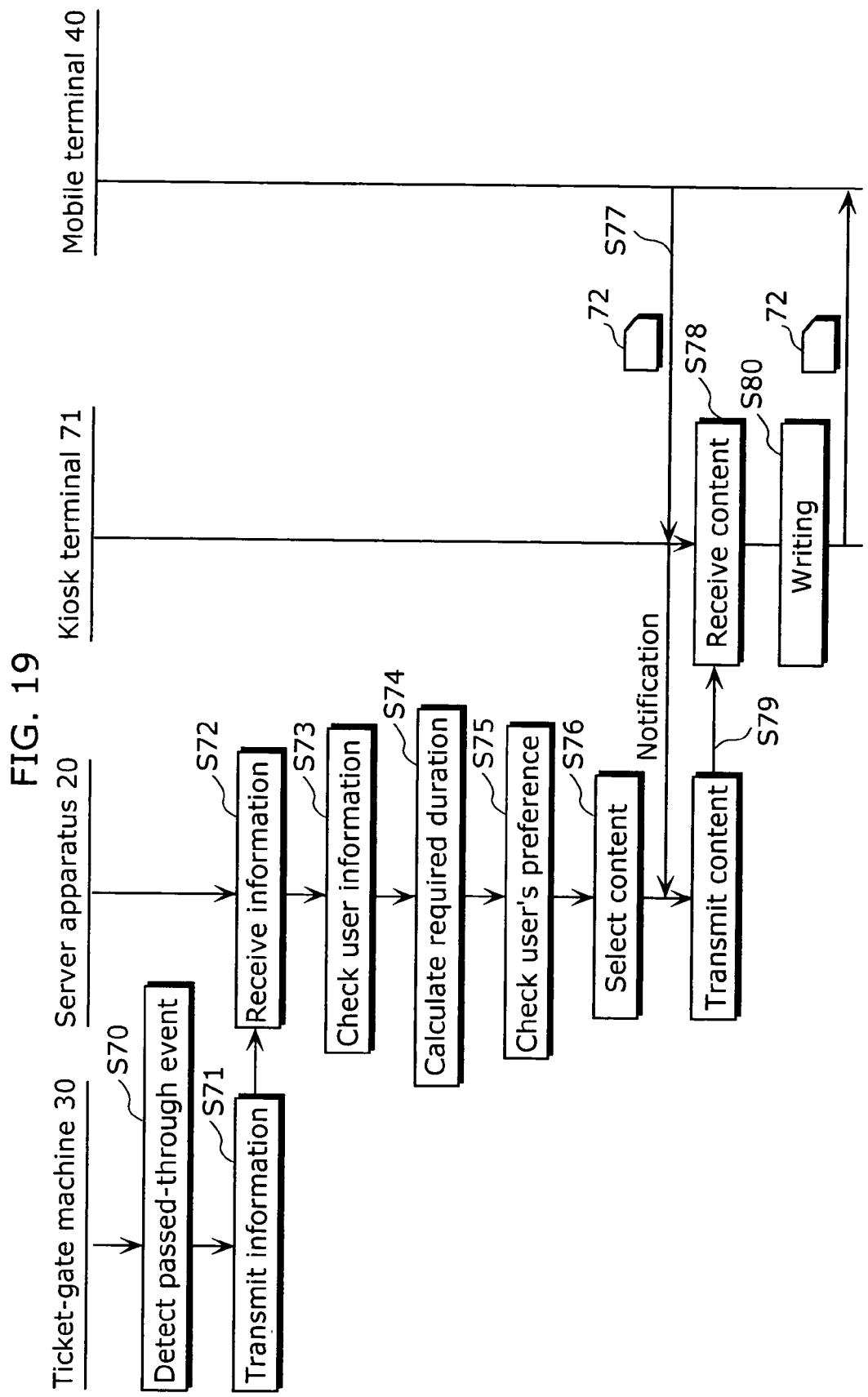
FIG. 19 is a communication sequence diagram showing an operation of the content delivery system.

FIG. 18 is a diagram showing an overall structure of a content delivery system 70 for delivering a content to the user via a memory card 72. FIG. 19 is a communication sequence diagram showing an operation of such content delivery system 70. When the user inserts the pass 31 into the ticket-gate machine 30 (S70), the pass information is sent to the server apparatus 20 (S71 and S72), after user is verified by the server apparatus 20 (S73), the required duration is calculated (S74), and the content is selected based on the preference information (S75 and S76). The above processing is same as the description in the first embodiment. In the content delivery system 70, when the user inserts the memory card 72 into a kiosk terminal (information "shop" terminal) 71 and an user ID stored in the memory card 72 or an user ID inputted to the kiosk terminal 71 is obtained (S77), that obtainment is notified to the server apparatus 20 from the kiosk terminal 71 (S78). As the result, a corresponding content is delivered from the server apparatus 20 to the kiosk terminal 71 (S79), and the content is written onto the memory card 72 under a viewing restriction (e.g. a restriction that the content can be viewed only once or the content can be viewed only within a duration corresponding to the required duration) (S80). After the writing, the user takes out the memory card 72 from the kiosk terminal 71 and inserts the memory card 72 into the own mobile terminal 40, so that the content can be viewed as in the case of the first embodiment.

Note that, the pass information may be identified and processed by the kiosk terminal 71 instead of the ticket gate machine 30. In other words, when the user inserts the pass 31 and the memory card 72 into the kiosk terminal 71, information about a boarding zone and a required duration is read out by the kiosk terminal 71, and the content may be written onto the memory card 72 by the kiosk terminal 71 after being processed by the server apparatus 20.

Further, while, in the first embodiment, the content is delivered to the mobile terminal 40 owned by the user, it may be delivered to a display device and the like that are placed in front of a seat in a train or a bus.

Figure 20:
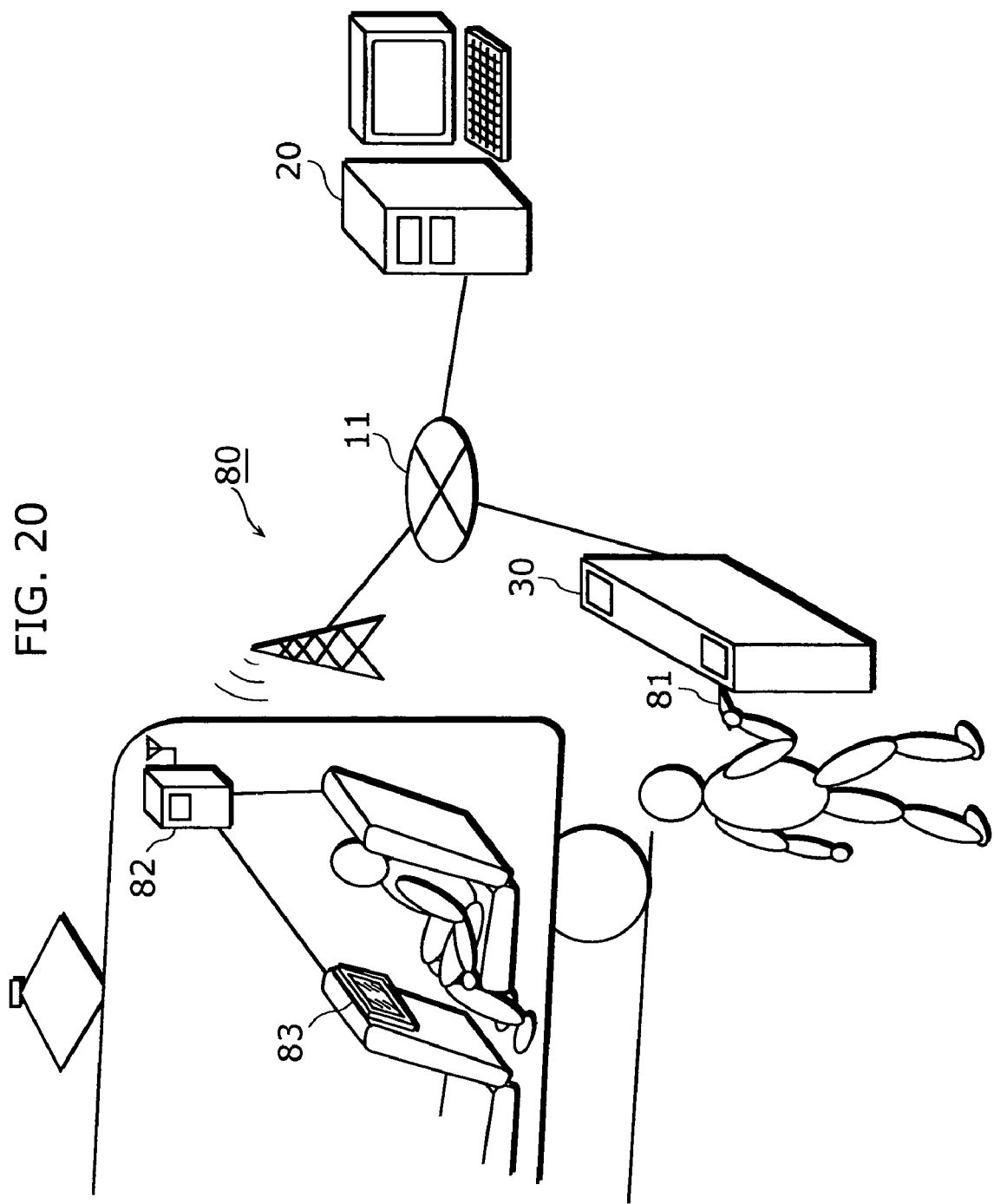
FIG. 20 is a diagram showing an overall structure of a content delivery system for delivering a content to a display device placed in front of a seat.
Figure 21:
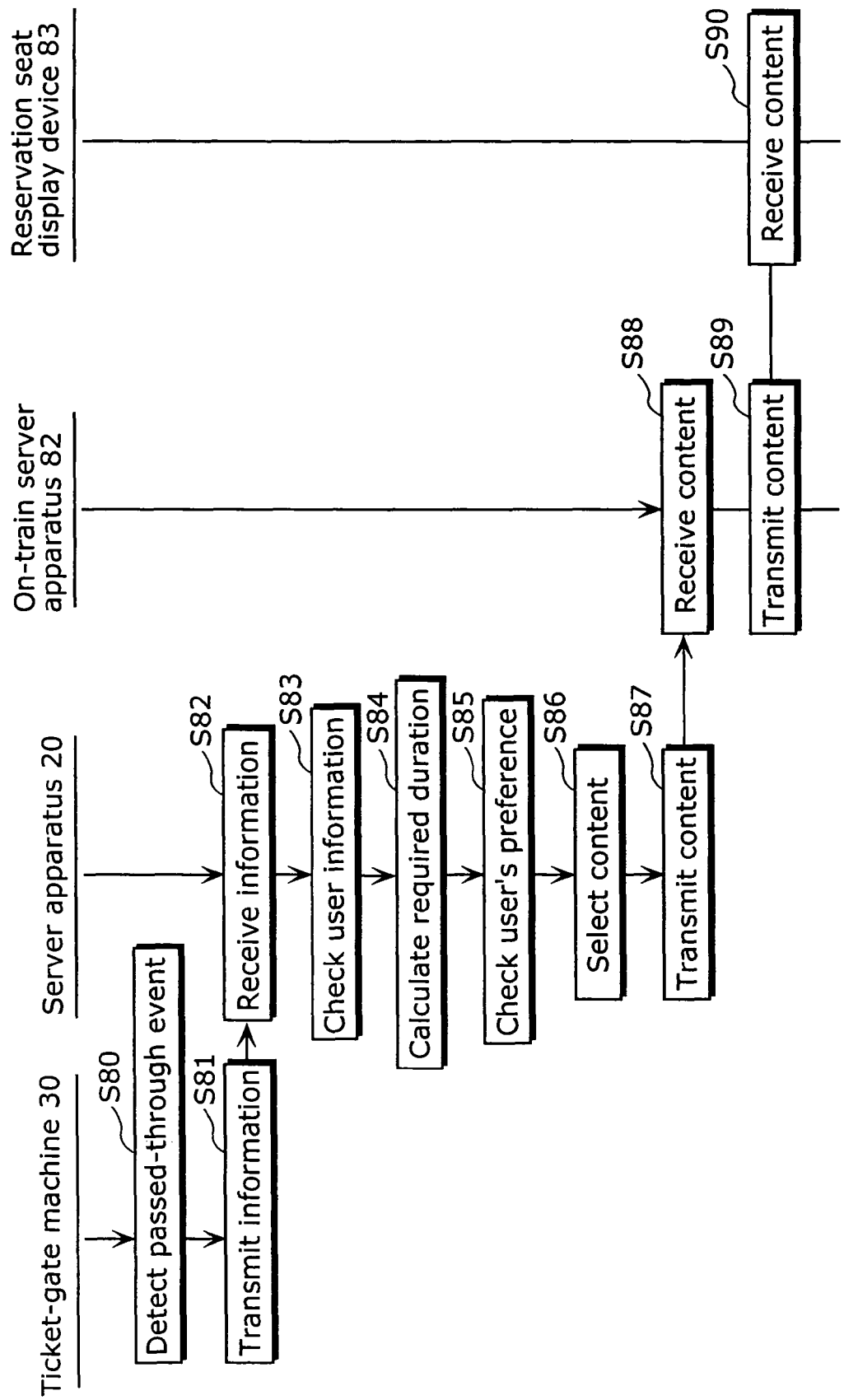
FIG. 21 is a communication sequence diagram showing an operation of the content delivery system.

FIG. 20 is a diagram showing an overall structure of a content delivery system 80 which delivers a content to a display device 83 placed in front of a seat. FIG. 21 is a communication sequence diagram showing an operation of such content delivery system 80. When the user inserts a seat reservation ticket 81 into the ticket gate machine 30 (S80), reservation ticket information such as a train number, a boarding zone and a reserved seat is read out and sent to the server apparatus 20 (S81 and S82); the user is verified by the server apparatus 20 (S83); the required duration is calculated (S84); and the content is selected based on preference information (S85 and S86). The above processing is same as the description in the first embodiment. In the content delivery system 80, the selected content is transmitted to a in-train server apparatus 82 from the server apparatus 20 based on the information about a corresponding train number (S87 and S88), and further, based on the information about a corresponding reservation seat, the selected content is transmitted from the in-server apparatus 82 to the display device 83 for the user's reservation seat (S89 and S90), and reproduced. Therefore, the user can view a preferred content corresponding to a boarding duration just by sitting on the reserved seat of the train after passing through the ticket gate. Note that, in the case where the in-train server apparatus 82 does not have seat information, a seat location of the user may be found by setting a reservation ticket, card, cellular phone and the like in which a user ID is stored.

Note that, while, in the present embodiment, the content is described as music and video as examples, it is not to mention that the content is not limited to such examples and may be the content that is made up of only audio information such as rakugo and manzai (Japanese comedic forms) so that the content can be broadcasted through a radio.

Also, in the second embodiment, the content such as music pieces is selected in accordance with the duration required for a user to get to the destination. However, the user may customarily listen to news and weather forecast on the radio, television and the like. In such case, when the content to be reproduced until the destination arrival estimation time is selected, the customarily listened information cannot be checked in a vehicle. Therefore, there may be realized a device which selects the best appropriate music pieces by extracting user's custom from the user's audio operation history and calculating duration in which music pieces and the like can be reproduced.

Accordingly, the user's custom may be extracted, for example, from the operation history of the on-vehicle audio device. For example, the viewing history of on-vehicle radio and on-vehicle television as shown in FIG. 22 is accumulated as history data into the history data accumulating unit 61 shown in FIG. 10. Based on the selection history of channels of radio and television as shown in the diagram, it is known that the user has a custom of listening audio from a channel sixth of the television around eight o'clock in every morning while driving. Also, it is known that the user has a custom of listening radio from 802 MHz at six fifty o'clock in every afternoon. These customs can be detected by analyzing, for each selected channel, the history data shown in FIG. 22 using a statistic method such as clustering. Considering such detected customs, the content such as music is selected.

For example, suppose there is a case that a user gets on a vehicle at seven o'clock in the morning and a destination arrival estimation time is at eight thirty in the morning based on a past driving history and a path search. Herein, while the driving duration is ninety minutes, the duration in which the music content and the like can be reproduced is sixty minutes from seven o'clock to eight o'clock in the morning since it has been known that the user views channel six from eight o'clock based on the custom. Therefore, the required duration calculating unit 53 shown in FIG. 10 performs such time calculation and notifies the music selecting unit 54 of the calculation result. The music selecting unit 54 then selects a content such as music pieces applied in sixty minutes. Accordingly, the user can reproduce, from seven to eight o'clock, music content, and view channel six from eight to eight thirty o'clock.

Note that, in the case where reproduction of the content such as music pieces exceeds the end estimation time because of the operation such as a suspension, the publicly broadcasted content such as radio and television may be recorded on a hard disk and the like and reproduced after the reproduction of the content such as music pieces is finished.

Also, the adjustment of the required duration while considering user's custom can be applied to the case of the first embodiment. For example, the reproduction duration of a content such as reproducible music pieces may be determined by extracting a duration necessary for an ordinary reproduction of content on the train.

Further, while, in the second embodiment, the content such as music pieces is selected in accordance with the duration necessary for the user to get to the destination, the content may be selected in accordance with user's familiarity to the road. Here, the familiarity to the road is a degree which indicates how much the user is used to travel the road: the road which the user often uses for commuting and schooling has a higher familiarity and the road which the user uses for the first time has a lower familiarity. Such familiarity to the road can be judged automatically from the user's driving history. For example, as shown in FIG. 23, a driver's approximate familiarity to the road can be obtained by calculating the number of times when the driver drove the road from the driving history in past. Using this result, a duration in which the driver drives on a road with high familiarity (the road with many number of driving times) is estimated and a content such as music pieces corresponding to the estimated duration can be selected. For example, the duration in which the user drives on the road on which the user usually drives is calculated, and a content such as music pieces to be reproduced for said duration is selected and reproduced. Accordingly, the user can concentrate on driving without reproducing music pieces while traveling on the road that is not usually used for traveling, and the music pieces can be reproduced only when the user travels on the familiar road. With respect to the familiarity calculation, as shown in FIG. 24, for each lattice obtained by dividing the road map in a lattice form, the familiarity to each region may be calculated in accordance with the duration for which the user visited there in past.

Also, in the case of traveling on an area where a large amount of traffic information comes in or on a road and the like where needs to be careful for traveling, the music pieces may be scheduled in advance so as not to reproduce the music pieces. In particular, the music reproduction schedule is set in advance so that the content is not reproduced when the user travels on the road on which the user needs to be careful to travel, such as a complicated crossing, a narrower street, a mountain road and the like. Then, in the case where the user drives on such roads, the reproduction of a music piece is stopped and an announcement, "please concentrate on driving" and the like may be made. Whether or not the road requires carefulness for traveling may be judged by setting the judgment in association with the map by the user.

Also, when a traveling distance of a vehicle is short, it is judged that the driver has not got used to drive a car and the reproduction of music pieces may be reduced. Similarly, the content such as music pieces may be selected by previously calculating a driving duration for which straight-ahead driving continues on a highway and the like and selecting a content such as music pieces in accordance with the calculated duration. Further, with respect to the driving on the highway and the like, the music pieces may be selected for every two hours as a unit in order to urge taking a break in every two hours.

Figure 25:
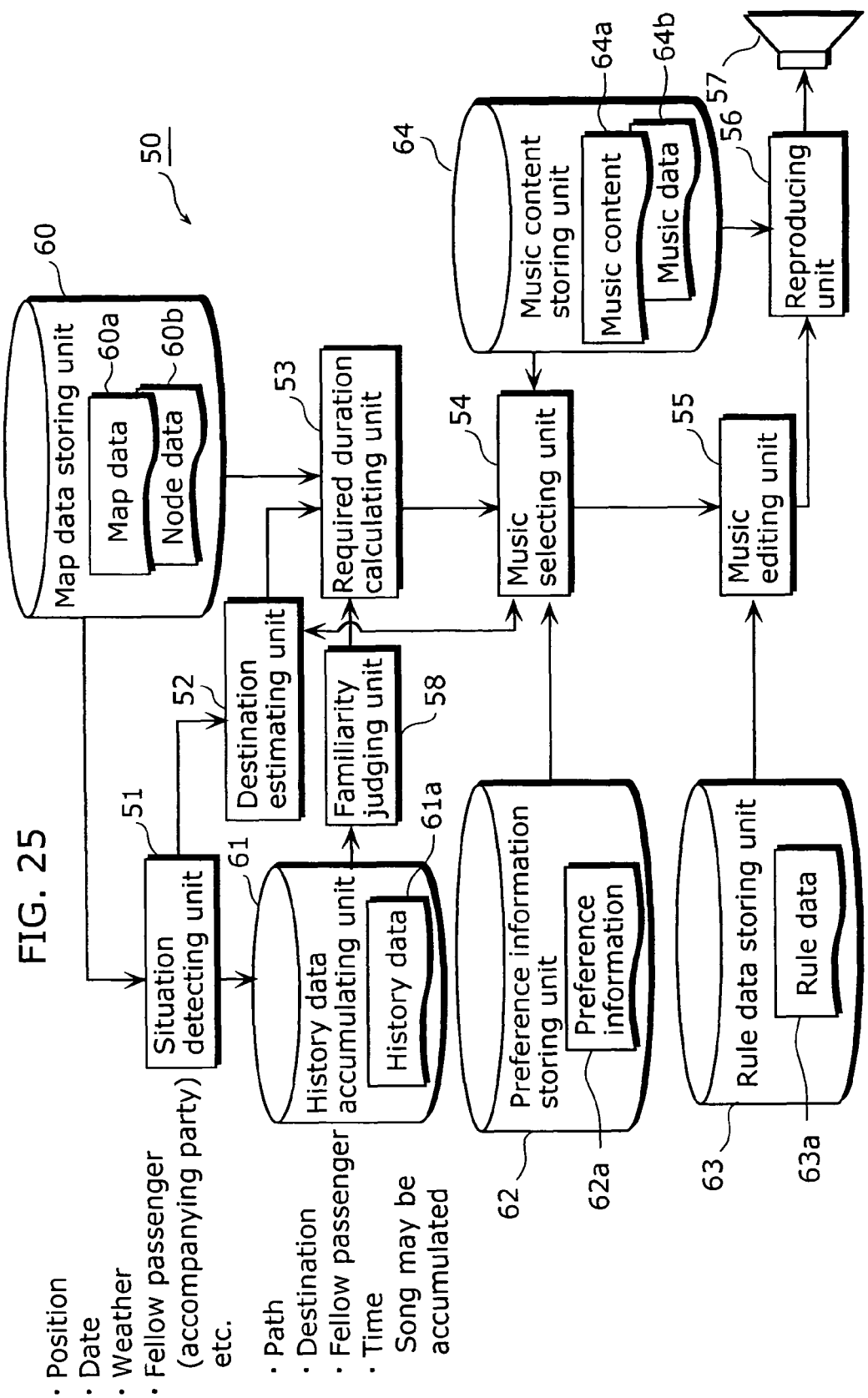
FIG. 25 is a functional block diagram showing a structure of an on-vehicle content reproduction apparatus which selects and reproduces the content in consideration of the familiarity with the road.

FIG. 25 is a functional block diagram showing a structure of an on-vehicle content reproduction apparatus which selects and reproduces a content in consideration with the familiarity to the road. The content reproduction apparatus adds a familiarity judging unit 58 to the structure shown in FIG. 10. The familiarity judging unit 58 judges a familiarity to the road to be taken, with reference to an output from the destination estimating unit 52 and the history data 61*a*. The required duration calculating unit 53 calculates a required duration necessary for the driver traveling a partial path judged to have a high familiarity by the familiarity judging unit 58 in the path estimated by the destination estimating unit 52, as a duration in which the driver can drive without focusing too much on driving. Such calculated duration is a duration in which the driver can reproduce music, in other words, a music reproducible duration.

As described above, from the past driving history and the like, in the case of a road that a driver uses for the first time, the driver particularly has to concentrate on driving. However, in the case of a road that the driver uses for commuting, schooling and the like, the driver may have known well about a crossing and the like where needs to be careful. Thus, even when the path to the destination is determined and the required duration is extracted, there are a path which needs to be taken carefully for driving and a path which is used to be taken for driving. Considering information such as the driver's past driving history, driving time range and weather, it is necessary to estimate a duration in which the music pieces can be reproduced.

The following method, for example, can be also taken for judging whether or not the path on which the user drives is a path where music can be reproduced. As shown in FIG. 26, the situation detecting unit 51 accumulates, for each road, information about whether or not music pieces had been reproduced while driving on the road, into the history data accumulating unit 61. The familiarity judging unit 58 judges whether or not the vehicle drives on a road where has a number of reproduction times that is higher than a pre-set threshold (i.e. a road with high familiarity), with reference to the history data 61a accumulated in the history data accumulating unit 61. As the result, in the case where it is judged that the vehicle drives on a road that is higher than a threshold, the required duration calculating unit 53 calculates a duration for driving the road as a duration for reproducing the music pieces. Thus, the familiarity judging unit 58 judges whether or not the road has a high familiarity for the user based on the frequency that music pieces were being reproduced in past.

Note that, based on the past traveling history, in the case where the music pieces had been reproduced until the arrival to the destination, in accordance with the destination, the duration may be calculated as duration in which the music pieces can be reproduced until the arrival to the destination. In other words, the familiarity judging unit 58 may judge the path as a path with high familiarity in the case where the music pieces had been reproduced from the departing location to the destination in the traveling history.

Also, in the case where a home location or a work location is registered in the map data storing unit 60 and the like, the surrounding locations may be judged as a path where the driver is familiar to drive and the duration may be calculated as a duration in which the music pieces can be reproduced. In other words, the familiarity judging unit 58 may judge that the paths near the home or work place has a higher familiarity.

Further, in the case where the destination is set at the time of leaving home and it can be judged, from the history data 61a, that the destination is the place to go for the first time, it may be judged that the familiarity is high for the path from the home which is used to be taken, from among the paths from the home to the destination, and music pieces may be reproduced. On the other hand, it may be judged that the familiarity is low for the path which is taken for the first time and the music reproduction duration may be calculated so as not to be included in the duration in which the music pieces are reproduced. Note that, even in the case of the path taken for the first time, the music reproduction duration may be calculated as a duration in which music pieces are reproduced, for a path for steady driving such as a highway. In other words, the familiarity judging unit 58 judges whether or not the vehicle drives on a highway by referring to the map data 60a, and may judge to drive on a road with high familiarity in the case of driving on the highway.

On the other hand, for a user who gets on a passenger seat or a back seat and do not need to drive a vehicle, a content such as video may be selected in accordance with the duration required for getting to the destination. Herein, in the case where a surrounding view can be enjoyed on the path when driving a tourist sight and the like, the duration in which a content is reproduced may be calculated by subtracting the duration for driving the location. It is assumed that the information about whether or not the surrounding view can be enjoyed on a path, in a tourist sight, has been previously stored in the map data storing unit 60. For example, in the case of driving on a "*** drive-way" and the like, the content may be selected by subtracting the duration for driving the path. On the other hand, while driving on a highway in a city, the content reproduction duration may be calculated as a duration in which music pieces are reproduced.

Also, in the first embodiment, the content is selected in accordance with the duration in which a user is traveling by transportation. However, in the case where the content capacity is large as in the case of where the content is a video with high-resolution and for a long-lasting, it is necessary to take the duration for downloading the content, the duration for writing the content onto a recording medium and the like, into consideration. In particular, in the case of transportation such as a train, there may be a case where it is difficult to download a content while reproducing the content by a mobile unit due to a restriction of preventing the mobile terminal from communicating in the train because of the influence on a human body by radio waves, or due to a condition of radio waves on the train and the like. In such case, it is necessary to download the content onto a mobile recording medium or a reproduction terminal using a terminal placed at a station and the like. For example, in the case where the content of 4 G byte is written onto a recording medium, it takes about 6 minutes and 40 seconds (400 seconds) even with the transportation velocity of 10M byte per second. Therefore, in the case where there is no sufficient waiting time for a train and the like, a user misses the train while writing the content onto a recording medium even when the content is selected. Consequently, it is necessary to select a content, considering the duration in which the content is written onto the recording medium.

Figure 27:
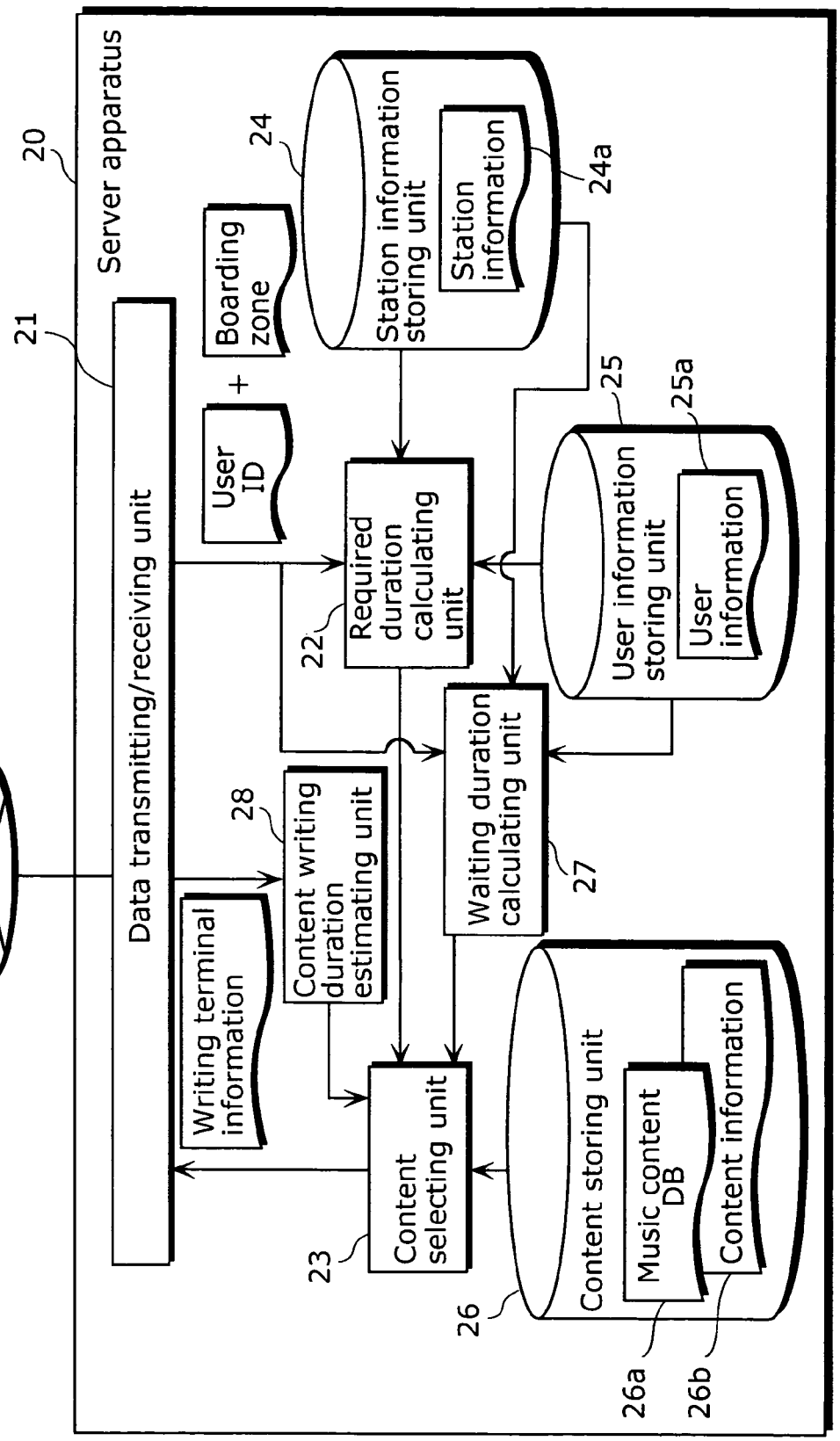
FIG. 27 is a functional block diagram showing a structure of a server apparatus in the content delivery system which considers a time required for writing the content onto a recording medium.

FIG. 27 is a functional block diagram showing a structure of a server apparatus in the content delivery system for automatically selecting and delivering the content which can be reproduced within the travel duration, in consideration with the duration required for writing the content onto a recording medium. In addition to the structure shown in FIG. 2, the server apparatus includes a waiting duration detecting unit 27 which detects waiting duration from the current time and information about the transportation used by the user, and a content writing duration estimating unit 28 which estimates duration required for writing the content based on a recording medium writing capability of a terminal and a transferring velocity according to the quality of a network.

The waiting duration detecting unit 27 calculates duration for a user waiting for a train based on a difference between a current time and a departing time of the train of which the user is going to take from a train departure time table stored in the station information storing unit.

The content writing duration estimating unit 28 estimates duration required for the content to be completely written onto a recording medium, considering a capability of a recording medium or a terminal onto which the user writes a content, and duration (transferring duration) required for the content to be transmitted from the server to a terminal placed in a station.

The content selecting unit 23 selects a content based on a writing duration estimated by the content writing duration estimating unit 28, a waiting duration detected by the waiting duration detecting unit 27, and the required duration calculated by the required duration calculating unit 22. For example, the content which can be written onto a user's recording medium within the waiting duration detected by the waiting duration detecting unit 27, and completed to be reproduced within the required duration calculated by the required duration calculating unit 22.

Figure 28:
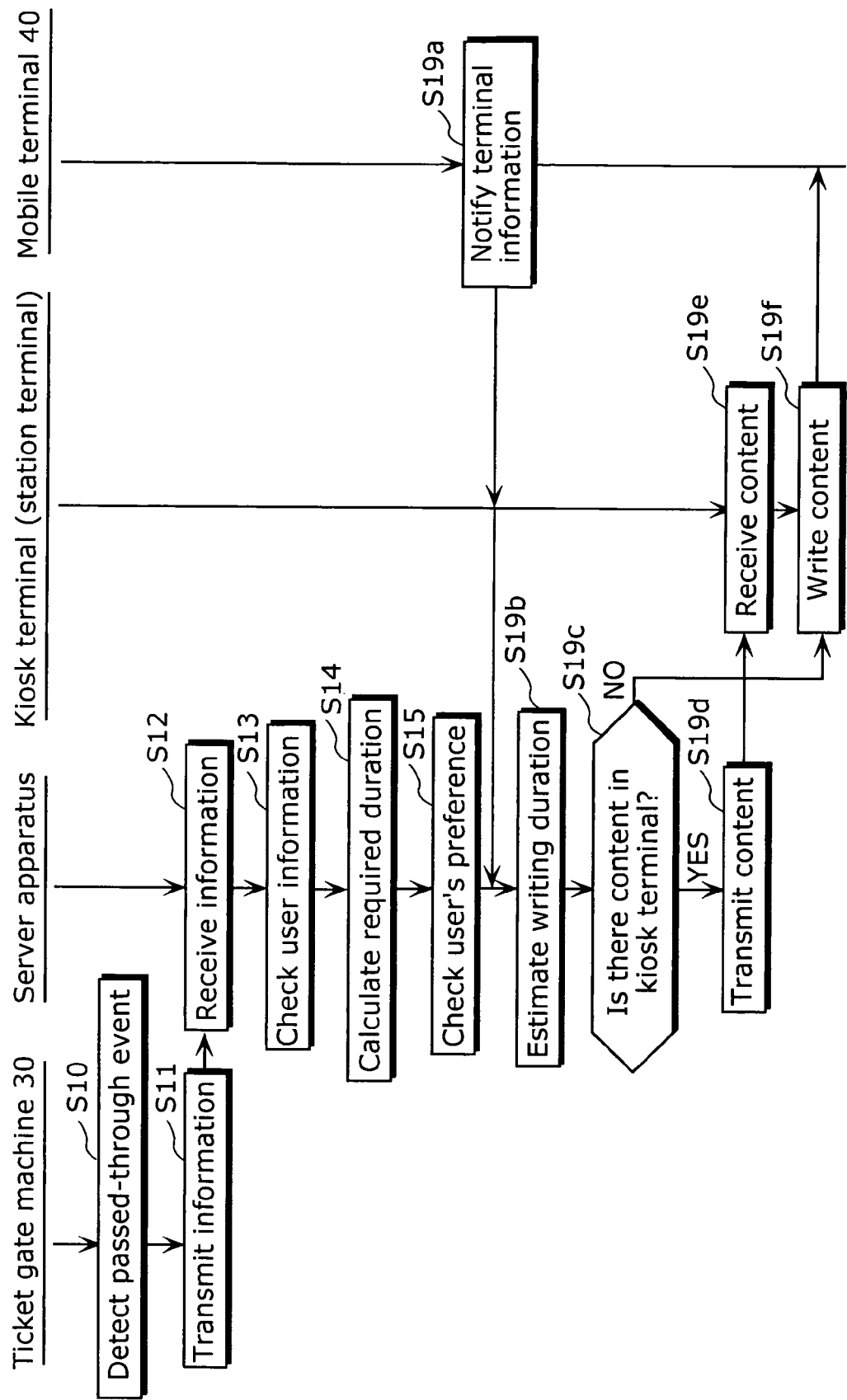

FIG. 28 is a communication sequence diagram showing a procedure of the content delivery in the content delivery system which is made up of the server apparatus and the like shown in FIG. 27. The procedure from steps S10 to S15 is same as the procedure shown in FIG. 6.

After the user's "preference information" is notified to the content selecting unit 23 by the required duration calculating unit 22 (S15), the content writing duration estimating unit 28 obtains terminal information (information indicating a capability of a recording medium or a terminal that is owned by a user) from the mobile terminal 40 via the data transmitting/receiving unit 21 (S19a), and estimates duration necessary for completely writing the content onto the recording medium (S19b), in consideration with the obtained terminal information and the transferring duration necessary for delivering the content to the terminal placed in a station (kiosk terminal) from the server device 20. The content selecting unit 23 selects a content based on the writing duration estimated by the content writing duration estimating unit 28, the waiting duration detected by the waiting duration detecting unit 27, and the "preference information" and the required duration notified from the required duration calculating unit 22. For example, the content selecting unit 23 selects a content which can be written, onto a user's recording medium, within the waiting duration detected by the waiting duration detecting unit 27, matches the "preference information" notified from the required duration calculating unit 22, and can be completely reproduced within the required duration.

After that, the content selecting unit 23 judges whether or not the selected content is placed at the kiosk terminal (S19c), in the case where the content is not placed, transmits the content to the kiosk terminal (S19d and S19e), and writes the content onto a user's recording medium via the kiosk terminal (S19f). On the other hand, in the case where the content is placed, the content selecting unit 23 instructs the placement of the content to the kiosk terminal, and the kiosk terminal writes the content onto the user's recording medium (S19f).

Note that, in the case where the server apparatus is placed at a station and the like, there is no need of transmitting the content via a network. Therefore, the content writing duration estimating unit 28 estimates a recording medium writing duration only based on the writing duration onto the recording medium. As shown in FIG. 29, for example, when the information relating to the content, its type, and a capacity of each content is stored in advance, it is assumed that the content is transferred to the recording medium brought by a user or a user's terminal, and that the duration necessary for the writing is 100 KB per second. Herein, the content writing duration estimating unit 28 calculates a duration necessary for writing each content (a right column of FIG. 29), from the capacity of each content. Based on the calculated duration, even in the case of delivering a content relating to news to a user, if sufficient writing duration cannot be hold because of less waiting duration for the train, the content selecting unit 23 selects and delivers a content whose content ID is "2" instead of selecting contents whose content IDs are "1" and "4". Note that, the content selecting unit 23 may select and deliver an appropriate file in accordance with a content writable duration by storing the same contents with different resolutions and compression rates: the multiple contents with different content capacities.

Figure 30:
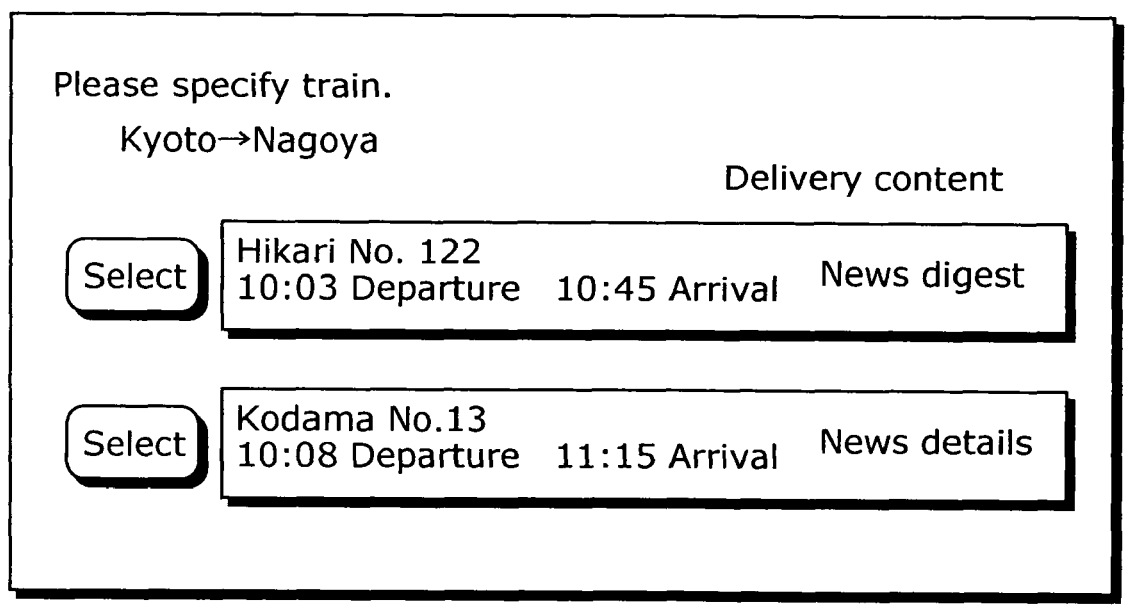
FIG. 30 is a diagram showing an example of a screen display for a user to select a content and a train in accordance with a boarding duration at the time of issuing a reservation seat.

Also, when a user designates a train, in the case where a required duration is different depending on a train, a content may be set simultaneously at the time of determining a reservation seat of the train. For example, when the user goes to Nagoya from Kyoto, the duration for waiting for the train to depart differs depending on which one of a Hikari and a Kodama the user gets. In other words, the duration available for writing the content differs depending on the above. Also, the boarding duration on the train, that is, the duration available for reproducing the content differs depending on the above. Therefore, the content selecting unit 23 presents a screen as shown in FIG. 30 to a user and a user him/herself may select a content and a train in accordance with the boarding duration of each train when issuing a reservation seat.

Further, there are many cases where an announcement for a train transfer information and the like is made at a certain time in the train. Here, in the case where a music list is generated by selecting a content, the content may be selected by considering the time when an announcement is made in the train. For example, the timing of switching music pieces may be set at the time when the announcement is made in the train, or a quiet music may be preferentially selected.

Also, in the case where the information to be announced can be obtained in advance, the information may be previously embedded into the content to be reproduced. For example, in the case where it is necessary to change a train at the station to be arrived in 30 minutes after the content reproduction is started, the content is configured so that the announcement information for the transfer information is reproduced at a point at which about 25 minutes has passed since the content reproduction has started. Accordingly, even in the case where it is difficult to hear real announcement in the train, the user can hear the transfer announcement to be reproduced by the mobile terminal so that the user can change a train without missing the transfer station.

As described above, according to the content delivery apparatus of the present invention, when the user passes through the ticket gate, a content whose reproduction is completed within a user's travel duration is automatically selected, and the user can receive a delivery of the content only by passing through the ticket gate. Therefore, the user can reliably view the delivered whole content while on traveling.

Also, the user can acquire a big satisfaction because the user can receive the delivery of the content and view the content which matches the user's preference.

Further, even in the case where the content designated by the user or the content matching the user's preference has a reproduction duration which exceeds user's travel duration, the content is delivered after being edited so as to be reproduced within the user's travel duration. Therefore, the user can view the whole content within the travel duration without interrupting viewing of the desired content.

Note that the content delivery system and content delivery apparatus according to the present invention may have any of the following structures.

More specifically, the present invention may be embodied as a content delivery system including: a mobile terminal for reproducing a content; a ticket gate machine; and a server apparatus that is connected, through a communication network, to the mobile terminal and the ticket gate machine, wherein the ticket gate machine identifies a boarding zone of a user ID of a user when detecting the user's entrance into a station area or boarding onto a vehicle, and transmits the identified user ID and the boarding zone to the server apparatus, the server apparatus includes: a user information storing unit which stores user information in which information for identifying a mobile terminal to which a content is delivered is associated with each user ID; a travel duration calculating unit which calculates a travel duration for a user traveling by vehicle, based on the boarding zone notified from the ticket gate machine; a content determining unit which determines a content whose reproduction is completed within the calculated travel duration; and a delivery unit which identifies, based on the user information stored in the user information storing unit, a mobile terminal corresponding to the user ID notified from the ticket gate machine, and delivers, to the identified mobile terminal, the content determined by the content determining unit, and the mobile terminal receives and reproduces the content delivered from the server apparatus.

The present invention may be embodied also as a content delivery system including: a content writing apparatus which writes a content onto a removable recording medium; a ticket gate machine; and a server apparatus that is connected, through a communication network, to the content writing apparatus and the ticket gate machine, wherein the ticket gate machine identifies a user ID and a boarding zone of a user when detecting the user's entrance into a station area or boarding onto a vehicle, and transmits the identified user ID and boarding zone to the server apparatus, the server apparatus includes: a travel duration calculating unit which calculates a travel duration for the user traveling by vehicle, based on the boarding zone notified from the ticket gate machine; a content determining unit which determines a content whose reproduction is completed within the calculated travel duration, and holds the determined content in association with the user ID notified from the ticket gate machine; and a delivery unit which delivers, when the user ID is notified from the content writing apparatus, to the content writing apparatus, the content which corresponds to the notified user ID and is determined by the content determining unit, and the content writing apparatus is receives the content delivered from the server apparatus while obtaining a user ID and notifying the obtained user ID to the server apparatus, and writes the received content onto the recording medium.

The present invention may be embodied also as a content delivery apparatus which is connected, through a communication network, to a content reproduction apparatus placed at a seat and to a ticket gate machine, the content delivery apparatus including: a delivery destination information storing unit which holds, as delivery destination information, information of a train number and a reservation seat and information indicating a delivery destination of a content to the content reproduction apparatus placed at the reservation seat; a travel duration calculating unit which calculates a travel duration for a user traveling by vehicle, based on a boarding zone notified from the ticket gate machine which identifies at least the boarding zone by detecting that the user's entrance into a station area or boarding onto the vehicle; a content determining unit which determines a content whose reproduction is completed within the calculated travel duration; and a delivery unit which identifies, based on the delivery destination information stored in the delivery destination information storing unit, a content reproduction apparatus corresponding to the train number and reservation seat number that are notified by the ticket gate machine which identifies the train number and the reservation seat number by detecting the user's entrance into a station area or boarding onto the vehicle, and delivers, to the identified content reproduction apparatus, the content determined by the content determining unit.

The above content delivery apparatus may further include a user information storing unit which holds user information in which preference information indicating a content preference is associated with each user ID, wherein the content determining unit may: receive a notification of a user ID by the ticket gate machine; identify, with reference to the user information, a preference of the user indicated by the user ID notified from the ticket gate machine; and determine a content which matches the identified preference.

The present invention may be embodied also as a content delivery apparatus which delivers a content to a mobile terminal which reproduces the content, the apparatus including: a user information storing unit which holds user information in which information for identifying a mobile terminal to which the content is delivered is associated with each user ID; a travel duration calculating unit which calculates a travel duration for the user traveling by vehicle based on a travel zone identified by a detecting unit of a ticket gate machine which detects the user's entrance into a station area or boarding onto the vehicle and identifies at least the boarding zone; a content determining unit which determines a content whose reproduction is completed within the calculated travel duration; and a delivery unit which identifies, based on the user information stored in the user information storing unit, a mobile terminal corresponding to the user ID notified from the detecting unit of the ticket gate machine, and delivers, to the identified mobile terminal the content determined by the content determining unit.

The above content delivery apparatus may further include: a waiting duration detecting unit which detects a waiting duration for which the user waits for boarding on the vehicle based on information about a transportation corresponding to the boarding zone identified by the detecting unit of the ticket gate machine, and a current time; and a content writing duration estimating unit which estimates a duration required for the delivery unit to finish writing the content onto a recording medium of the mobile terminal from a start of delivering of the content, wherein the content determining unit may, determine a content whose reproduction is completed within the travel duration and whose writing is completed within the waiting duration, by judging whether or not the content writing is completed within the waiting duration, based on the content writing duration estimated by the content writing duration estimating unit and the waiting duration detected by the waiting duration detecting unit.

Furthermore, according to the on-vehicle content reproduction apparatus of the present invention, the content whose reproduction is completed within the required duration necessary for getting to the destination is automatically reproduced. Therefore, inconveniences such that viewing of the content has to be stopped in the middle of the reproduction can be avoided.

Also, the content is selected based on the estimated destination. Therefore, even in the case where the user does not input the destination, an appropriate content whose reproduction is completed within the travel duration is selected and reproduced.

Note that the content reproduction apparatus according to the present invention may have any of the following structures.

More specifically, the present invention may be embodied as an on-vehicle content reproduction apparatus which reproduces a content, the apparatus including: a viewing history accumulating unit which accumulates a viewing history relating to a broadcast viewing by a user; a destination identifying unit which identifies a destination to which a vehicle is headed; a duration calculating unit which calculates a duration required to get to the identified destination; a content determining unit which determines a content whose reproduction is completed within a duration, in the viewing history, other than a duration in which a user customarily views a content, the viewing history being accumulated by the viewing history accumulating unit; and a reproducing unit which reproduces the determined content.

The present invention may be embodied also as an on-vehicle content reproduction apparatus which reproduces a content, the apparatus including: a driving history accumulating unit which accumulates a driving history in past; a destination identifying unit which identifies a destination to which a vehicle is headed; a required duration calculating unit which calculates a duration required for getting to the identified destination; a content determining unit which determines a content whose reproduction is completed within, in the calculated required duration, a duration for driving on a road used for driving for a predetermined number of times or more in the driving history accumulated in the driving history accumulating unit; and a reproducing unit which reproduces the determined content.

The present invention may be embodied also as a content reproduction apparatus that is an on-vehicle content reproduction apparatus which reproduces a content, the apparatus including: a history data accumulating unit which accumulates a driving history in past and a reproduction history indicating a reproduction of music pieces in past; a destination identifying unit which identifies a destination to which a vehicle is headed; a required duration calculating unit which calculates a duration required for getting to the identified destination; a content determining unit which determines a content whose reproduction is completed within, in the calculated required duration, a duration for driving on a road on which the music pieces are reproduced based on the driving history and the reproduction history accumulated in the history data accumulating unit; and a reproduction unit which reproduces the determined content.

Thus, according to the present invention, an appropriate content corresponding to the user's travel duration is automatically delivered to the user and automatically reproduced by the automatic selection. This brings a relaxed and comfortable feeling to a person on traveling, a driver and the like. Thus, the practical value of the present invention is very high.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

A content delivery apparatus according to the present invention can be used as a server apparatus which delivers a content such as music data to a mobile terminal device and the like via a communication network such as the Internet. Also, the content reproduction apparatus according to the present invention can be used as an on-vehicle content reproduction apparatus, an audio player, a car navigation integrated audio device which reproduces content such as music data.

What is claimed is:

1. A content delivery apparatus which is connected, through a communication network, to a mobile terminal for reproducing a content and to a ticket gate machine, said apparatus comprising:
   a user information storing unit operable to hold user information in which information for identifying a mobile terminal to which a content is delivered is associated with each user ID;
   a travel duration calculating unit operable to calculate a travel duration for a user traveling by vehicle, based on a boarding zone notified from a ticket gate machine which identifies at least the boarding zone by detecting the user's entrance into a station area or boarding onto the vehicle;
   a content determining unit operable to determine a content to be reproduced whose reproduction completes within the calculated travel duration; and
   a delivery unit operable to identify, based on the user information stored in said user information storing unit, a mobile terminal corresponding to the user ID notified from the ticket gate machine, and to deliver the content determined by said content determining unit.

2. The content delivery apparatus according to claim 1, wherein the user information further includes preference information indicating a content preference for each user ID, and
said content determining unit is operable to identify, with reference to the user information, a preference of the user indicated by the user ID notified by the ticket gate machine, and to determine a content matching the identified preference.

3. The content delivery apparatus according to claim 2, wherein said content determining unit is operable to, in the case where a reproduction duration of a content matching the preference, edit the content so that the reproduction duration of the content falls within the travel duration, and to determine the edited content as the content to be reproduced.

4. The content delivery apparatus according to claim 1, wherein said content delivery apparatus is further operable to obtain information from a content storing unit in which a plurality of contents are stored, and
said content determining unit is operable to determine, as the content to be reproduced, a content whose reproduction duration is within the travel duration, from among the plurality of contents stored in said content storing unit.

5. The content delivery apparatus according to claim 4, wherein said content determining unit is operable to determine, as the content to be reproduced, a content whose reproduction duration is within the travel duration and is closest to the travel duration, from among the plurality of contents stored in said content storing unit.

6. The content delivery apparatus according to claim 4, wherein said content determining unit is operable to obtain, in advance, a content designated by a user, and to determine, as the content to be reproduced, the designated content in the case where a reproduction duration of the designated content is within the travel duration.

7. The content delivery apparatus according to claim 6, wherein said content determining unit is operable to, in the case where the reproduction duration of the designated content exceeds the travel duration, edit the designated content stored in said content storing unit so that the reproduction duration of the designated content falls within the travel duration, and to determine the edited content as the content to be reproduced.

8. The content delivery apparatus according to claim 1, further comprising
a station information storing unit operable to hold station information in which required durations for respective station zones are registered,
wherein said travel duration calculating unit is operable to calculate the travel duration with reference to the station information.

9. The content delivery apparatus according to claim 8, further comprising
a station information updating unit operable to update the required durations of the station information stored in said station information storing unit,
wherein said travel duration calculating unit is operable to calculate the travel duration with reference to the station information updated by said station information updating unit.

10. The content delivery apparatus according to claim 8,
wherein said content determining unit is operable to estimate, from the station information stored in said station information storing unit, a time when an in-vehicle announcement is made, and to determine the content considering the estimated time.

11. The content delivery apparatus according to claim 8,
wherein said delivery unit is operable to deliver the content determined by said content determining unit by embedding a content of an in-vehicle announcement, based on the station information stored in said station information storing unit.

12. The content delivery apparatus according to claim 1,
wherein a boarding zone notified by the ticket gate machine only includes a boarding station,
said content delivery apparatus further comprises
a destination identifying unit operable to identify a destination of the user,
the travel duration calculating unit is operable to identify a boarding zone from a boarding station included in the boarding zone and the destination identified by said destination identifying unit, and to calculate the travel duration based on the identified boarding zone.

13. The content delivery apparatus according to claim 1, further comprising:
a waiting duration detecting unit operable to detect a waiting duration for which the user waits for boarding on the vehicle, based on information about a transportation corresponding to the boarding zone identified by the ticket gate machine and on a current time; and
a content writing duration estimating unit operable to estimate a writing duration required for said delivery unit to finish writing the content onto a recording medium of the mobile terminal from a start of delivering the content,
wherein said content determining unit is operable to determine a content whose reproduction is completed within the travel duration and whose writing is completed within the waiting duration, by judging whether or not the content writing is completed within the waiting duration, based on the content writing duration estimated by said content writing duration estimating unit and on the waiting duration detected by said waiting duration detecting unit.

14. The content delivery apparatus according to claim 13,
wherein said content writing duration estimating unit is operable to estimate the writing duration considering a capability of a recording medium onto which the content is written or a capability of a terminal, and a duration required for said content delivery apparatus to transmit the content to the mobile terminal.

15. A content writing apparatus which receives a content delivered from the content delivery apparatus according to claim 1, and writes the content onto a removable recording medium.

16. A content delivery method for use in a server apparatus to deliver a content, the server apparatus being connected, through a communication network, to a mobile terminal for reproducing the content and to a ticket gate machine,
wherein the server apparatus includes
a user information storing unit operable to store user information in which information for identifying a mobile terminal to which a content is delivered is associated with each user ID,
said content delivery method comprises:
calculating a travel duration for a user traveling by vehicle, based on a boarding zone notified by the ticket gate machine which identifies at least the boarding zone by detecting the user's entrance into a station area or boarding onto the vehicle;
determining a content whose reproduction completes within the calculated travel duration;
identifying, based on the user information stored in the user information storing unit, a mobile terminal corresponding to the user ID notified from the ticket gate machine; and
delivering, to the identified mobile terminal, the content determined in said determining.

17. A program embodied on a non-transitory computer-readable medium for in a content delivery apparatus which is connected, through a communication network, to a mobile terminal for reproducing the content and to a ticket gate machine, said program causing a computer to execute said steps described in the content delivery method according to claim 16.

18. A content delivery system comprising:
a content reproduction apparatus that is placed at a seat;
a ticket gate machine; and
a server apparatus that is connected, through a communication network, to said content reproduction apparatus and said ticket gate machine,
wherein said ticket gate machine is operable to at least identify a boarding zone and a seat when detecting a user's entrance into a station area or boarding onto a vehicle, and to transmit, to said server apparatus, the identified boarding zone and the seat,
said server apparatus includes:
a travel duration calculating unit operable to calculate a travel duration for the user traveling by vehicle, based on the boarding zone notified from said ticket gate machine;
a content determining unit operable to determine a content whose reproduction is completed within the calculated travel duration; and
a delivery unit operable to deliver the determined content to said content writing apparatus corresponding to the seat notified from said ticket gate machine, and
said content reproduction apparatus is operable to receive the content delivered from said server apparatus, and to reproduce the received content.

* * * * *